(12) United States Patent
Kammer et al.

(10) Patent No.: US 6,523,073 B1
(45) Date of Patent: Feb. 18, 2003

(54) HANDHELD COMPUTER SYSTEM AND METHOD TO DETECT AND IDENTIFY A PERIPHERAL DEVICE

(75) Inventors: David Kammer, Seattle, WA (US); Jesse Donaldson, Sunnyvale, CA (US); Neal Osborn, Milpitas, CA (US)

(73) Assignee: Palm Computing, Inc., Santa Clara, CA (US)

(*) Notice: Subject to any disclaimer, the term of this patent is extended or adjusted under 35 U.S.C. 154(b) by 0 days.

(21) Appl. No.: 09/500,711

(22) Filed: Feb. 9, 2000

Related U.S. Application Data

(63) Continuation-in-part of application No. 09/379,552, filed on Aug. 23, 1999.

(51) Int. Cl.$^7$ .............................................. G06F 13/00
(52) U.S. Cl. ......................... 710/48; 710/46; 710/260
(58) Field of Search .............................. 710/1–2, 8–10, 710/15–19, 46–50, 260–269

(56) References Cited

U.S. PATENT DOCUMENTS

| | | | | |
|---|---|---|---|---|
| 5,793,993 A | * | 8/1998 | Broedner et al. | 710/106 |
| 5,931,936 A | * | 8/1999 | Chung et al. | 710/263 |
| 5,999,989 A | * | 12/1999 | Patel | 710/1 |
| 6,038,613 A | * | 3/2000 | Garcia et al. | 710/1 |
| 6,141,703 A | * | 10/2000 | Ding et al. | 710/10 |
| 6,336,152 B1 | * | 1/2002 | Richman et al. | 710/8 |
| 6,438,638 B1 | * | 8/2002 | Jones et al. | 710/301 |
| 6,442,637 B1 | * | 8/2002 | Hawkins et al. | 710/300 |
| 6,453,371 B1 | * | 9/2002 | Hampson | 710/37 |

* cited by examiner

Primary Examiner—Christopher B. Shin
(74) Attorney, Agent, or Firm—Wagner Muribito & Hao LLP

(57) ABSTRACT

The present invention is a system and method that facilitates extendible identification of various peripheral devices coupled to a hand held computer. In one embodiment of a present invention peripheral device identification system and method, an initial pulse of an interrupt signal received by the hand held computer initiates an interrupt routine that continues to monitor the interrupt signal for additional pulses within a predetermined time. A hand held computer peripheral device identification system and method of the present invention correlates the number of received pulses with the type of peripheral device coupled to the serial port. In one exemplary implementation of the present invention, a hand held computer peripheral device identification detection system and method utilizes a hash table to map the number of pulses to a type of peripheral device. In one embodiment of the present invention, the hand held computer peripheral device identification system and method is backward compatible and capable of identifying legacy peripheral devices such as a cradle or modem.

22 Claims, 16 Drawing Sheets

HANDHELD COMPUTER SYSTEM AND METHOD TO DETECT AND IDENTIFY A PERIPHERAL DEVICE

This application is a continuation in part and claims the benefit of U.S. patent application Ser. No. 09/379,552 filed Aug. 23, 1999, entitled "POWER MANAGED PERIPHERAL COMMUNICATIONS" which is hereby incorporated by reference.

BACKGROUND OF THE INVENTION

1. Field of the Invention

This invention relates to the field of handheld computers and peripheral device identification. In particular, the present invention relates to managing a communications port of a handheld computer and providing a flexible peripheral device identification system and method that is easily adaptable to identify a variety of peripheral devices.

2. Related Art

As the components required to build a computer system have reduced in size, new categories of computer systems have emerged. One of the new categories of computer systems is the hand held or "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few. Since palmtop computer systems are very small, they are usually limited in the range of functions they perform. It is often beneficial to couple a palm computer with peripheral devices to expand functionality. The greater the variety of peripheral devices a hand held computer is capable of operating with the broader the functionality the palm computer can achieve.

The management of communications port contention and power consumption affect the ease of use and the battery life of handheld computers. A typical handheld computer includes limited communications port resources. For example, the Palm V personal organizer has only one communications port available to interface with peripherals. When the communications port is exclusively occupied by a peripheral, the communications port is unavailable for other uses. For example, a handheld computer with an active keyboard occupying the communications port may be unable to perform an infrared synchronization process with another handheld computer.

Another ease of use issue is the degree of user intervention required to manage a communications port and identify peripheral devices coupled to the communications port. Requiring a user to manually open the communications port and identify a peripheral device coupled, for example through the graphical user interface or the buttons of the handheld computer, may be less preferable to automatically opening the communications port and identifying the peripheral device when the handheld computer receives information from a peripheral device. Further, requiring a user to explicitly close the communications port may be less preferable to automatically closing the communications port after the peripheral device and the handheld computer no longer exchange data. In one existing solution, the handheld computer will automatically close a communications channel, which was opened to work with a keyboard peripheral, when the handheld computer is prompted with a signal prompting a synchronization process, e.g. by a cradle for a HotSync process. However, if a user forgets to explicitly close the communications port after using a keyboard that occupied the communications port, the user may be unable to perform an infrared synchronization process.

At best, the user is delayed with extra steps; at worst, the user may have the mistaken impression that the handheld computer has malfunctioned.

Requiring a user to manually close the communications port also affects power consumption. Battery powered systems, such as handheld computers, are sensitive to applications that drain excessive power. Thus, handheld computers mostly leave their communications ports in a low power standby mode. An open communications channel may consume significant power. For example, the Palm V personal organizer has a communications port included in the processor that is shared between an infrared communications port and an RS-232 serial communications port. The Palm V handheld organizer keeps these ports in standby to reduce power consumption. A user that forgets to close the communications port after a peripheral device is no longer used may suffer a significantly decreased battery life, and be forced to recharge or change batteries often.

Even when a user closes the communications port, the port has to be reopened for further communications with a peripheral device. When the communications port is reopened the attached peripheral device needs to be identified. Identifying the peripheral device permits the hand held computer to open appropriate applications and select appropriate communication protocols. Some traditional hand held computers provided limited peripheral device identification of a cradle or modem by determining a logical value on a legacy peripheral identification pin. For example, in a palm hand held computer, this is traditionally done with two pins on a serial port. In the traditional technique, an interrupt is generated by bringing up one of the pins. An interrupt routine then checks the second pin to determine if it is high or low (high indicates modem, low indicates cradle). The problem with this technique is that it only allows two different types of devices to wake the serial port. The traditional peripheral device identification is limited to identifying one of two devices, a cradle or modem. As hand held computer technology and applications advance a greater number of peripheral devices are coupled to the hand held computers but are not identifiable by traditional hand held computers.

Accordingly, what is needed is hand held computer peripheral device identification system and method that facilitates extendible identification of various peripheral devices.

SUMMARY OF THE INVENTION

Various embodiments of the invention provide an improved method and apparatus for managing communications port contention and power consumption for a handheld computer, in particular those with a communications protocol that boosts power consumption when active, such as RS-232. The improved method provides communications channel management that automatically closes the communications channel. A communications channel includes interfaces coupling a peripheral with the handheld computer, and the communication port, which may be included in the processor of the handheld computer or in an external device.

If the user of the handheld computer is finished using a peripheral utilizing the communications channel, yet forgets to manually close the communications channel, or fails to send a wake-up signal to the handheld computer, e.g., for a synchronization process such as a HotSync process, the communications channel still automatically closes. Limited communications channel resources are thereby made available, and power is conserved which would otherwise be squandered by maintaining a power hungry communications protocol that is not being used. The wake-up signal is part of a signal sent to a handheld computer to initiate a synchronization process for communicating data between the handheld computer and another computer. The wake-up signal also includes signals sent by non-cradle peripherals for initiating a communication of data with the handheld computer. The wake-up signal may cause the handheld computer to change from a lower power state to a higher power state.

In one embodiment, the handheld computer can be detachably coupled to a computer peripheral device via the communications port of the handheld computer. Various computer peripherals include a computer cradle for a synchronization process between the handheld computer and another computer, and other non-cradle peripherals, such as a modem, a keyboard, and a wireless communications device. The handheld computer receives a wake-up signal over the communications port. The wake-up signal may physically travel to the communications port through physical interfaces including a connector and an infrared interface. Responsive to receiving the wake-up signal, the handheld computer turns on, or changes to a high power state from a low power state. A communications channel is opened to the computer peripheral. Then, the computer peripheral is identified. If the computer peripheral is the cradle, then a synchronization function is performed between the handheld computer and another computer. If the computer peripheral is a non-cradle peripheral, then data is communicated with the non-cradle peripheral.

In various embodiments, the computer peripheral device is explicitly and implicitly identified. Identifying the computer peripheral assists the handheld computer in proceeding to the software and hardware functions appropriate for the particular computer peripheral, and in particular, the appropriate communications and power management functions.

In explicit identification, a computer peripheral sends a signal specifically identifying the computer peripheral.

In cases where the computer peripheral device can be limited to two possibilities, for example, a cradle and a non-cradle device such as a keyboard, implicit identification may be appropriate. Following the wake-up signal, the handheld computer waits for a device identification timeout period. If the handheld computer receives no data, then the handheld computer concludes that the cradle device sent the wake-up signal, and the synchronization process continues. If the handheld computer receives data, then the handheld computer concludes that the non-cradle device sent the wake-up signal, and executes a program appropriate for that non-cradle device.

In another embodiment, the handheld computer receives multiple wake-up signals, and identifies the particular computer peripheral from a number of wake-up signals received.

In various embodiments, the opened communications channel is closed in response to receiving some data from the peripheral device, and/or after a device timeout expires without the handheld computer receiving data from the computer peripheral device. If the communications channel can be opened relatively quickly and without consuming much power, the handheld computer may close the communications channel in response to receiving the data which prompted the sending of the wake-up signal. In another embodiment, the handheld computer waits for data until a timeout period ends, and if the handheld computer fails to receive data, or a group of data, from the computer peripheral device before an expiration of the timeout, the communications channel is closed.

Other aspects and advantages of the invention can be seen upon review of the figures, the detailed description, and the claims which follow.

The present invention is a system and method that facilitates extendible identification of various peripheral devices coupled to a hand held computer. In one embodiment of a present invention peripheral device identification system and method, an initial pulse of an interrupt signal received by a hand held computer initiates an interrupt routine that continues to monitor the interrupt signal for additional pulses within a predetermined time. A hand held computer peripheral device identification system and method of the present invention correlates the number of received interrupt signal pulses with the type of peripheral device coupled to the serial port. In one exemplary implementation of the present invention, a hand held computer peripheral device identification detection system and method utilizes a hash table to map the number of pulses to a type of peripheral device. In one embodiment of the present invention, the hand held computer peripheral device identification system and method is backward compatible and capable of identifying legacy peripheral devices such as a cradle or modem.

In one embodiment of the present invention, a hand held computer monitors an interrupt pin that is also subject to a human-triggered pulse. After receiving an initial pulse, which may be human triggered or triggered by mechanics within the peripheral, the hand held computer continues to monitor for sub-pulses that are received within a time period that is too short for a human to create another triggered pulse. The hand held computer counts the number of such pulses to identify a particular peripheral device type.

DETAILED DESCRIPTION OF THE INVENTION

Figure 1:
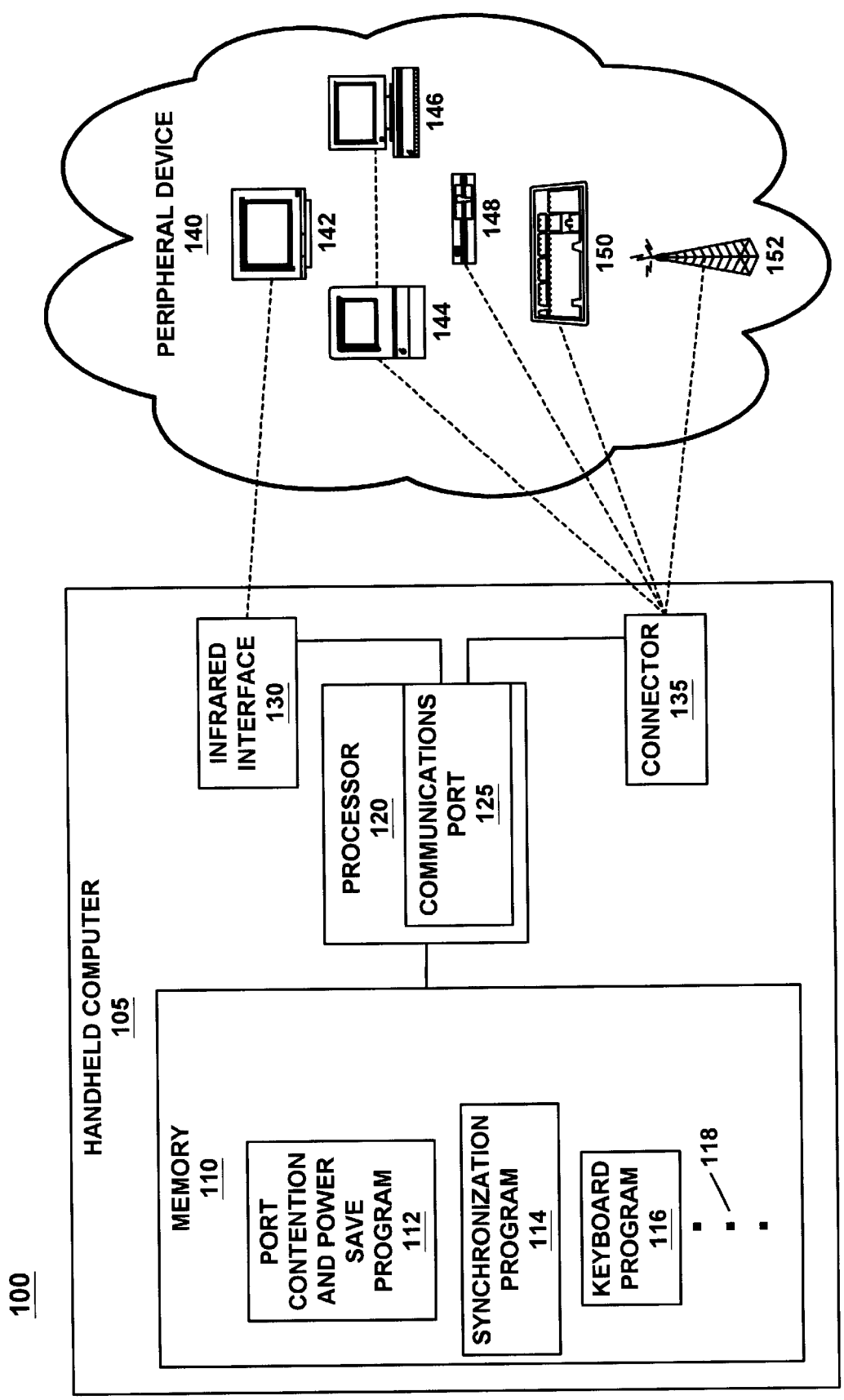
FIG. 1 is a block diagram of a system with the invention practicing port contention resolution and power consumption reduction including a handheld computer and a peripheral device.

Reference will now be made in detail to the preferred embodiments of the invention, a system and method to detect and identify a peripheral device communicatively coupled to a handheld computer, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A. System Overview

A detailed description of the preferred embodiments of the invention is provided with reference to FIGS. 1–5. FIG. 1 shows a system practicing the invention. FIGS. 2–5 show flowcharts illustrating various process flows for practicing the invention.

Referring now to FIG. 1, a block diagram is shown of a system 100 practicing port contention resolution and power consumption reduction. The system 100 includes a handheld computer 105 and a peripheral device 140. Example embodiments of the handheld computer include handheld computers such as the Palm III, Palm IIIx, Palm IIIe, Palm V, Palm VII, PalmPilot Professional, PalmPilot Personal, pilot 1000, pilot 5000, and other handheld computers running a version of a PalmOS operating system. Other embodiments include other handheld computers, such as handheld computers running a version of a Windows CE operating system and handheld computers running a version of an EPOC operating system, and set-top boxes. Examples of peripherals include keyboards, cradles, modems, and other computers, such as handheld computers.

The handheld computer 105 includes a memory 110, a processor 120, an infrared interface 130, and a connector 135. The memory 110 includes various programs, sequences of instructions for execution on the processor 120. Example programs are a port contention and power consumption program 112, a synchronization program 114, and a keyboard program 116. Other programs 118 include programs for carrying out other internal functions of the handheld computer 105 and for carrying out functions appropriate with a peripheral device 140. Some of the programs may be included in drivers, the operating system, and/or applications.

The processor 120 includes a communications port 125. The handheld computer 105 communicates with the peripheral device 140 via one or more communications ports 125. One embodiment of the processor 120 is a Dragon Ball" processor by Motorola. The Palm IIIx and Palm V handheld computers use a DragonBall processor model known as the Dragon Ball EZ MC68EZ238 Integrated Microprocessor. Other embodiments use a different microprocessor. The communications port 125 implemented in the DragonBall EZ includes one serial port.

Other embodiments of the invention implement multiple serial ports, one parallel port, multiple parallel ports, and other configurations.

Even if an embodiment is not limited to one communications port and includes multiple communication ports, the invention permits an increase in a total number of peripherals which the handheld computer may communicate with. Additionally, an embodiment including multiple communications ports has a larger scope of benefiting from power savings by minimizing power consumption of each communications port.

The communications port 125 communicates to the peripheral device 140 via a wired or wireless connection. An example of a wireless connection is a communication between two handheld computers 105 and 142 carried out in infrared through an infrared interface 130 coupled to the communications port 125. In infrared communication, an infrared transceiver included in the infrared interface 130 of the handheld computer 105 communicates with the infrared transceiver of another handheld computer 142. The transceivers follow an IrDA (Infrared Data Association) protocol. In other embodiments, other protocols are used.

Examples of a wired connection are communication between the handheld computer 105 and a cradle 144, through a connector 135 coupled to the communications port 125, and communication between the handheld computer 105 and a keyboard 150 through the connector 135 coupled to the communications port 125. This is the configuration that is often used to synchronize data between the handheld computer 105 and the computer 146.

In communication through the connector 135, one embodiment uses an electrical transceiver and a serial connector with 10 pins supporting EIA562 interface signals and RS-232 protocol communications, and additional signals for support of another peripheral device 140 such as a cradle 144, a modem 148, a keyboard 150, and a wireless communication device 152 such as a Bluetooth device. Information on the Bluetooth communication specification is available on the Internet at the address http://www.bluetooth.com.

One possible configuration of the connector 135 supporting EIA562 interface signals and RS-232 protocol communications includes DTR (data terminal ready), VCC, RD (receive data), RTS (request to send), TD (transmit data), CTS (clear to send), GPI1 (HotSync initiation interrupt line), GPI2 (peripheral identification line for synchronization), a pin reserved for future designs, and SG (signal ground).

Another possible connector configuration of the connector 135 supporting EIA562 interface signals and RS-232 protocol communications includes DO (voltage doubler output or data terminal ready), VBATT+(tied to the battery), RXD (receive data), RTS (request to send), TXD (transmit.data), CTS (clear to send), I1 (HotSync initiation interrupt line), I2 (peripheral identification line for synchronization), a pin reserved for future designs, and SG (signal ground).

Other embodiments of the connector 135 include parallel connectors, different pin configurations, a different number of pins, and different connector signals including DSR (data set ready), RI (ring indicator), CD (carrier detect), and TC (transmitter clock).

One embodiment of the handheld computer 105 includes an electrical transceiver used in communication through the connector 135. When the electrical transceiver is shut down, the transceiver sends a low RS-232_V+signal of 3.0 volts to the connector 135. In the Palm handheld organizer, the electrical transceiver is shutdown or in standby when the connector 135 is inactive, to conserve power and lengthen battery life for the handheld computer 105. When software running on the processor 120 of the handheld computer 105 opens the communications port 125, the transceiver is enabled and sends to the connector 135 an asserted signal, a high RS-232_V+signal of 6.0 volts.

Other embodiments include communications protocols that are simplex and half duplex in addition to the full duplex RS-232 protocol. Other embodiments support RS-485, RS-422, IEEE-1284, IEEE-1394, and USB standards.

The peripheral device 140 could be another handheld computer 142, a cradle 144, a modem 148, a keyboard 150, or a wireless communication device 152. Other peripherals such as cellular, personal communication services, and other wireless devices including radio, infrared, and acoustic communication peripherals, and Bluetooth devices could be used. The peripheral device 140 includes circuitry for sending a wake-up signal to the handheld computer 142 through the connector 135 and circuitry for identifying to the handheld computer 142 a type of the peripheral device 140, and both types of circuitry are electrically coupled to the handheld computer 142 through the connector 135. The type of the peripheral device includes a non-cradle peripheral and a computer cradle. In other embodiments, the type of peripheral device includes another handheld computer 142, a cradle 144, a modem 148, a keyboard 150 or a wireless communication device 152, or a serial number or model number.

The cradle 144 hold and connects to the handheld computer 105. The cradle 144 couples the handheld computer and another computer 146 in a synchronization process, e.g. a HotSync process, to exchange information between the handheld computer 105 and the computer 146. During the synchronization process, the processor 120 executes the synchronization program 114.

FIG. 2, FIG. 3, FIG. 4, and FIG. 5 include methods of identifying the peripheral device coupled to the handheld computer 105 and methods of deciding how much data to receive before closing an open communications channel. The described process flows describe various solutions to multiple problems: 1) sharing a limited number of communications ports, 2) conserving power by limiting a duration of an opened communications port, and 3) identifying a peripheral device coupled to the communications port.

The uses of a cradle and a keyboard are exemplary and the methods are not limited to those peripheral devices. For example, explicit references to a keyboard and keyboard data may be replaced with references to another peripheral device, such as a modem and modem data. Some of the various steps are not limiting or exclusive and thus may be exchanged in order, deleted, and accept additional steps.

Figure 2:
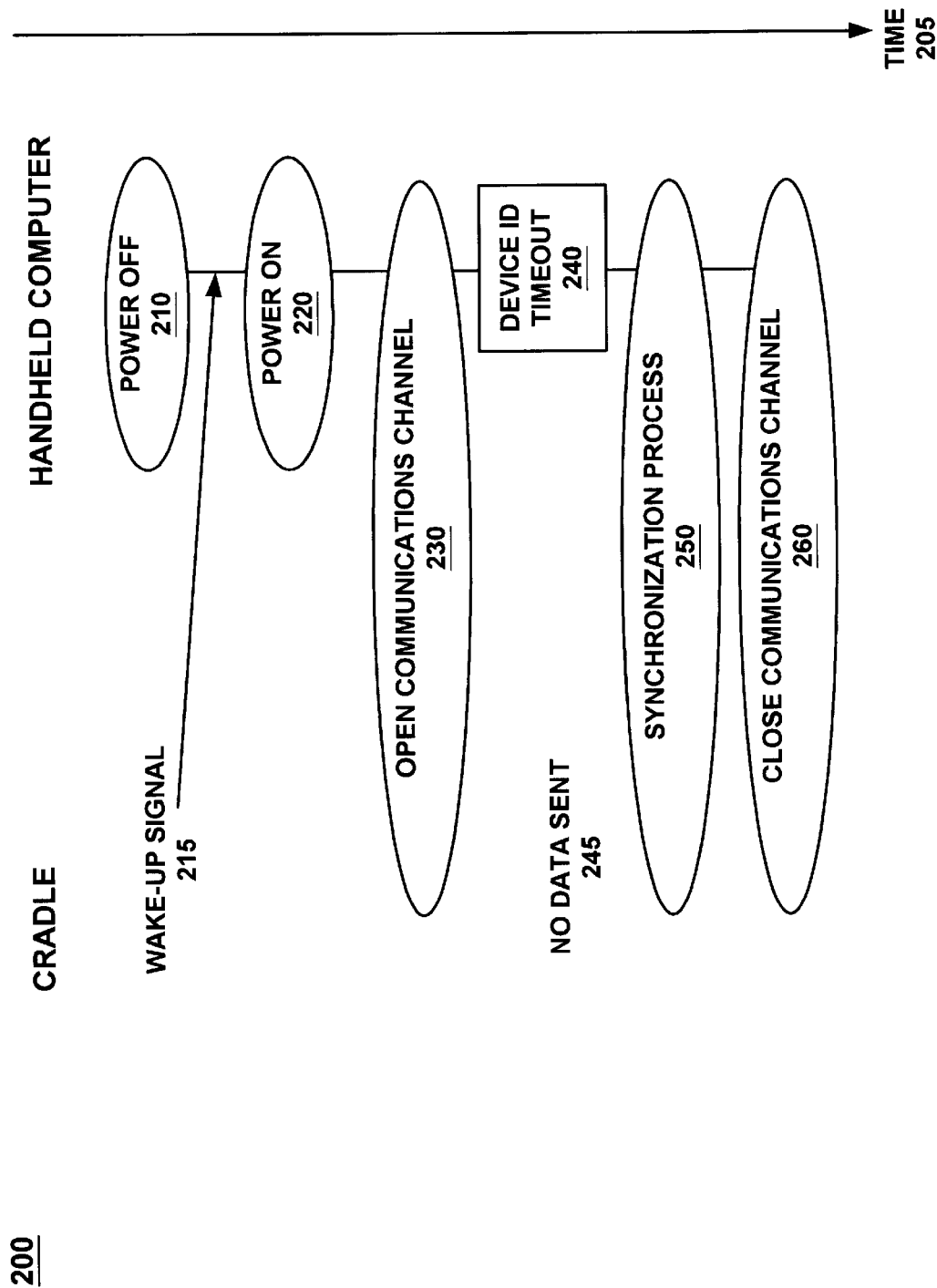
FIG. 2 is a flowchart showing implicit device identification between a handheld computer and a computer cradle with a device identification timeout period.
Figure 3:
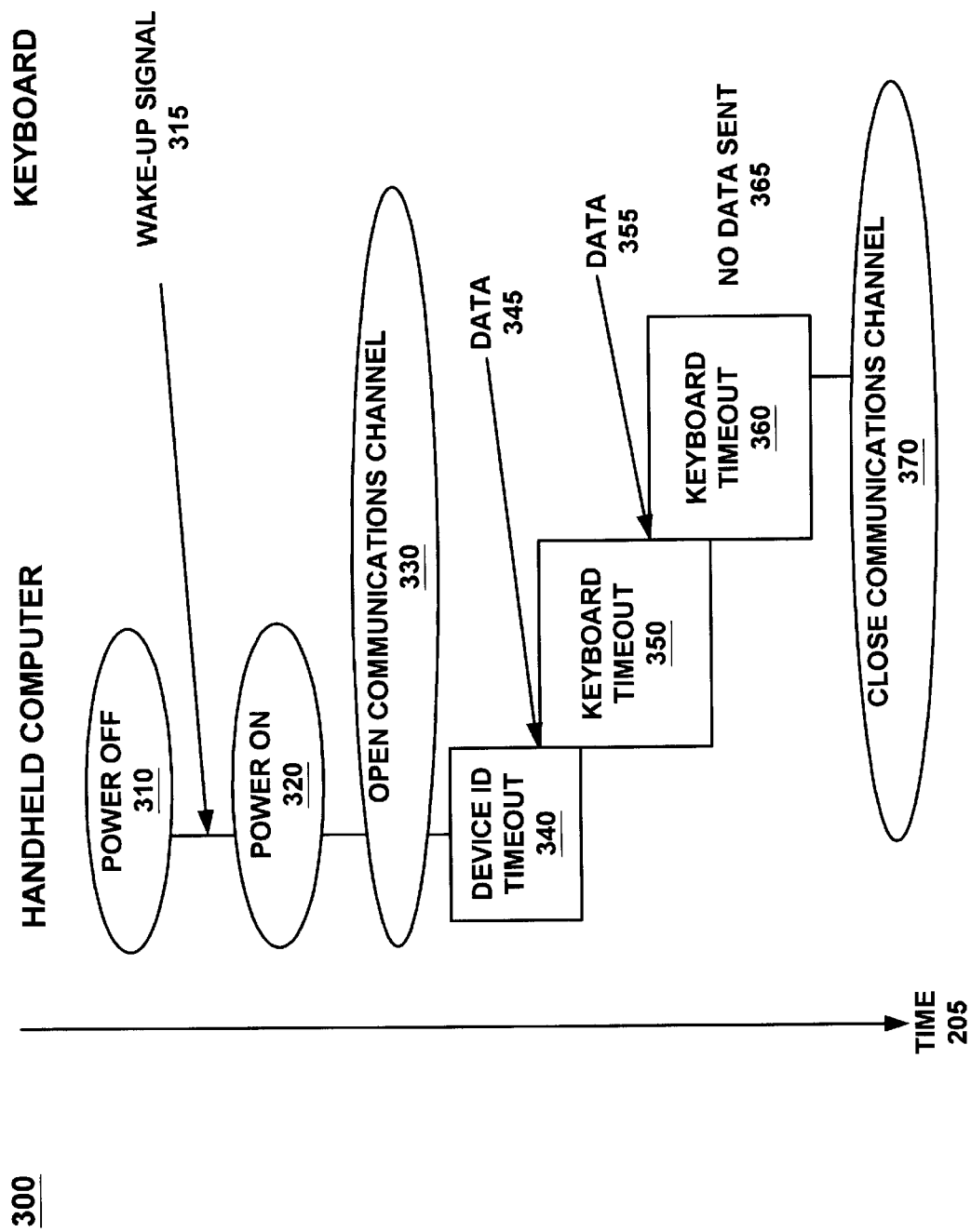
FIG. 3 is a flowchart showing implicit device identification with a device identification timeout period and a timeout channel shutdown between a handheld computer and a keyboard.

Referring now to FIG. 2 and FIG. 3, a flow chart 200 and a flow chart 300 shows example process flows of port contention and power consumption reduction. FIG. 2 and FIG. 3 both illustrate implicit device identification between a handheld computer 105 and a peripheral device. Flowchart 200 illustrates implicit device identification between a handheld computer 105 and a cradle 144, and flowchart 300 illustrates implicit device identification between a handheld computer 105 and a keyboard 150. In both flowcharts 200 and 300, the time axis 205 advances from the top of the figure to the bottom of the figure.

Note, these examples presume that only one device is connected to the connector 135. However, other embodiments allow multiple devices to be simultaneously connected to the connector 135.

Referring to the flow chart 200, the cradle sends a wake-up signal 215 to the handheld computer 105. This wake-up signal is part of the start of a synchronization process. Responsive to receiving the wake-up signal 215, the handheld computer 105 changes from a power off state 210 to a power on state 220. Then, the handheld computer 105 opens a communications channel 230 over the communications port 125. Opening a communications channel includes preparing software and hardware on the handheld computer 105 for active communication with another device, e.g., initializing a serial library including setting up global variables and turning on RS-232 drivers including setting handshaking signals.

At this point, the processor 120 of the handheld computer 105 is unaware of the type of peripheral device that sent the wake-up signal 215. The system 100 can inform the handheld computer 105 implicitly or explicitly about the type of peripheral device sending the wake-up signal 215. Another method can count a number of wake-up signals sent by a peripheral device to identify the peripheral device sending the wake-up signal.

In flow chart 200, an implicit method is used. The implicit method enjoys the advantage of backward compatibility for a system 100 not equipped with explicit identification abilities. Older peripherals lacking explicit identification ability can use implicit identification after software for the handheld computer 105 is upgraded. To decide the type of peripheral device, the handheld computer 105 waits for a device identification timeout period 240. During this device identification timeout period 240, either the handheld computer 105 will receive data or not receive data.

In the case of the cradle 144 sending the wake-up signal 215, no data is sent 245 by the cradle 144 before the device identification timeout period 240 expires. The handheld computer 105 implicitly decides that the cradle 144 is the source of the wake-up signal 215. The handheld computer 105 continues to the synchronization process 250. Following the synchronization process 250, the handheld computer 105 closes the communications channel 260, freeing the communications port 125. Closing the communications channel includes freeing some or all of the hardware and software resources used in opening the communications channel, e.g., freeing the communications port 125 and turning off the RS-232 drivers. In another embodiment, the handheld computer 105 implicitly decides that the keyboard 150 is the source of the wake-up signal when no data is sent 245 before the device identification timeout period 240 expires.

Referring to the flow chart 300, the keyboard 150 sends a wake-up signal 315 to the handheld computer 105. In one embodiment, to send the wake-up signal the keyboard couples two pins of the handheld computer connector, for example coupling VBATT+ and I1, or coupling pins VCC and GP1.

Responsive to receiving the wake-up signal 315, the handheld computer 105 changes from a power off state 310 to a power on state 320. The handheld computer 105 opens a communications channel 330 over the communications port 125. In one embodiment, the handheld computer opens a communications port for exclusive use between the handheld computer 105 and the keyboard 150, activates software RS-232 drivers, and initiates high power mode to permit RS-232 protocol communications between the keyboard 150 and the handheld computer 105.

At this point the processor 120 of the handheld computer 105 is unaware of the type of peripheral device which sent the wake-up signal 315. To decide the type of peripheral device, the handheld computer 105 waits for a device identification timeout period 340. In one embodiment, the software of the handheld computer 105 is adapted to respond to the wake-up signal 315 so that the handheld computer 105 that would otherwise continue with a synchronization process waits for data. During this device identification timeout period 340, either the handheld computer 105 will receive data or not receive data.

In the case of the keyboard 150 sending the wake-up signal 315, the keyboard 150 sends keyboard data 345 before the device identification timeout period 340 expires. The keyboard data may be received over one or more pins of the connector 135. The keyboard 150 may be designed to send the keyboard data after the process of opening the communications channel is complete. Because of the keyboard data, the handheld computer 105 implicitly decides that the keyboard 150 is the source of the wake-up signal 315. At this point, the handheld computer 105 can continue to one of several options prior to closing the communications channel. For example, the handheld computer 105 can continue to maintain an open communications channel while a timeout period does not expire without the handheld computer receiving data from the computer keyboard data, or the handheld computer 105 can close the communications channel immediately. The example in flowchart 300 uses the timeout period method. In another embodiment, the handheld computer 105 implicitly decides that the cradle 144 is the source of the wake-up signal 315 responsive to the handheld computer 105 receiving data.

Referring again to the flow chart 300, responsive to receiving the keyboard data 345 before the expiration of device identification timeout 340, the handheld computer 105 initiates a keyboard timeout 350. Responsive to receiving the keyboard data 345 prior to the expiration of keyboard timeout 350, the handheld computer 105 starts keyboard timeout 360. The keyboard 150 sends no data 365 prior to the expiration of the keyboard timeout 360, and the handheld computer 105 closes the communications channel 370. The handheld computer 105 powers down the RS-232 port, and RS-232 communications between the keyboard 150 are ended, freeing the communications port 125 to communicate with another computer peripheral or to reinitiate RS-232 communications with the keyboard 150. At 315 note that the handheld computer 105 may not have to power itself on step 330 because it may still be on, but the communications port would need to be opened again.

The duration of keyboard timeouts 350 and 360 can be longer than the duration of device identification timeout 340. In one embodiment, a keyboard 150 will send a wake-up signal when a user has typed a key. Keyboard data may be buffered and sent to the handheld computer 105, e.g. after the communications port is opened 330. The device identification timeout 340 can be relatively brief, having only to retrieve this buffered keyboard data. In one embodiment, the device identification timeout 340 is 10–500 milliseconds. Subsequent keyboard timeouts 350 and 360 are dependent on human typing speeds.

Figure 4:
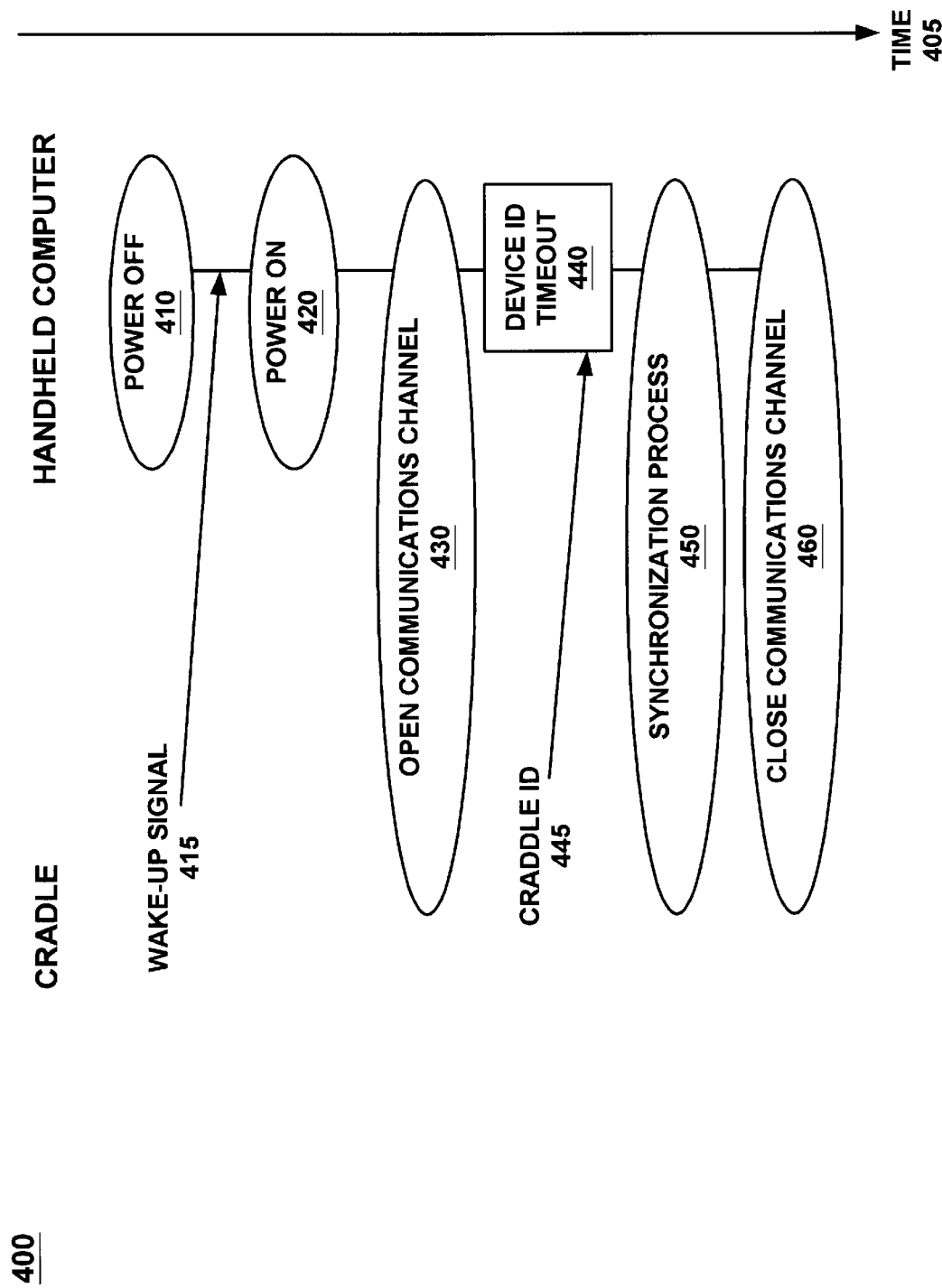
FIG. 4 is a flowchart showing explicit device identification between a handheld computer and a computer cradle.
Figure 5:
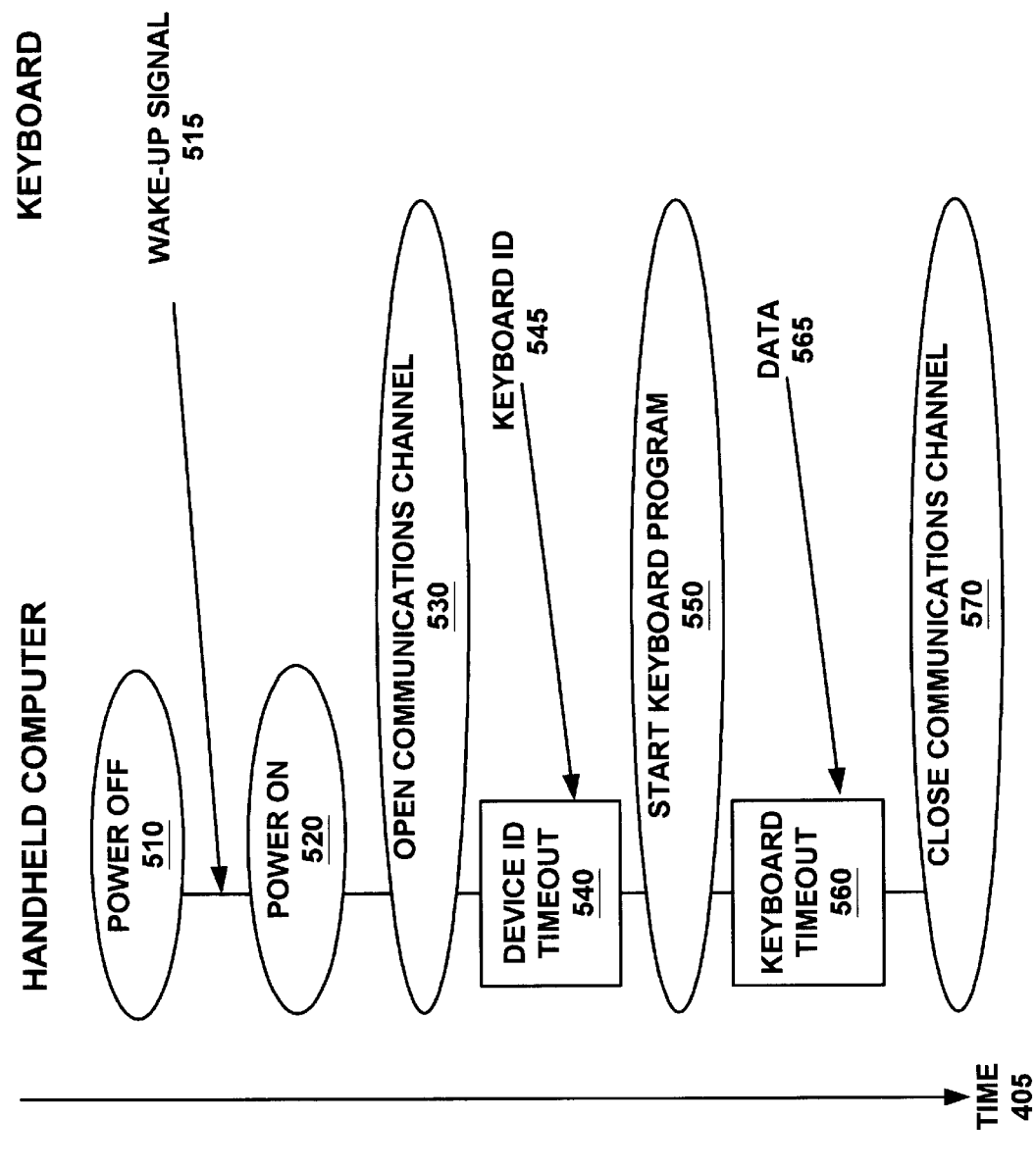
FIG. 5 is a flow chart showing explicit device identification with an immediate channel shutdown between a handheld computer and a keyboard.

Referring now to FIG. 4 and FIG. 5, a flow chart 400 and a flow chart 500 shows example process flows of port contention and power consumption reduction. Flowcharts 400 and 500 both illustrate explicit device identification between a handheld computer 105 and a peripheral device. Flowchart 400 illustrates explicit device identification between a handheld computer 105 and a cradle 144, and flowchart 500 illustrates explicit device identification between a handheld computer 105 and a keyboard 150. In both flowcharts 400 and 500, the time axis 405 advances from the top of the figure to the bottom of the figure.

Referring to the flow chart 400 of FIG. 4, the cradle 144 sends a wake-up signal 415 to the handheld computer 105. Responsive to receiving the wake-up signal 415, the handheld computer 105 changes from a power off state 410 to a power on state 420. The handheld computer 105 opens a communications channel 430 over the communications port 125.

To decide the type of peripheral device that sent the wake-up signal 415, the handheld computer 105 waits for a device identification timeout period 440. During this device identification timeout period 440, the handheld computer 105 awaits an identification signal that explicitly indicates the type of peripheral device that sent the wake-up signal 415. This period is optional but may help where both explicit and implicit device identification peripherals are used in the system 100. A device identification signal can be a signal sent on the same or different pin of the connector 135 as the pin for sending a wake-up signal. The device identification signal can send a device identification, vary a voltage, current, or other amplitude or modulation that corresponds to the type of peripheral device sharing the communications channel with the handheld computer 105. A look-up table storing the corresponding device types may be stored in the memory 110 of the handheld computer 105. Explicit identification enjoys the advantage of not making the high power RS-232 mode necessary. If the device identification signal indicates a type of peripheral that does not use the RS-232 protocol, then the RS-232 drivers are not activated and power is conserved. For example, a peripheral device communicating over the infrared interface 130 may not require RS-232 protocol communications.

In the case of the cradle 144 sending the wake-up signal 415, a cradle identification signal is sent 445 by the cradle 144 before the device identification timeout period 440 expires. The handheld computer 105 receives explicit information that the cradle 144 is the source of the wake-up signal 415. The handheld computer 105 proceeds to execute the synchronization program 114 and continues with the synchronization process 450. The handheld computer 105 then closes the communication channel 460.

Referring to the flow chart 500 of FIG. 5, the keyboard 150 sends a wake-up signal 515 to the handheld computer 105. Responsive to receiving the wake-up signal 515, the handheld computer 105 changes from a power off state 510 to a power on state 520. The handheld computer 105 opens a communications channel 530 over the communications port 125.

To decide the type of peripheral device which sent the wake-up signal 515, the handheld computer 105 waits for a device identification timeout period 540. During this device identification timeout period 540, the handheld computer 105 awaits an identification signal that explicitly indicates the type of peripheral device that sent the wake-up signal 515. In the case of the keyboard 150 sending the wake-up signal 515, a keyboard identification signal is sent 545 by the keyboard 150 before the device identification timeout period 540 expires. The handheld computer 105 receives explicit information that the keyboard 150 is the source of the wake-up signal 515. The handheld computer 105 starts the keyboard program 550 and proceeds to execute the keyboard program 116.

At this point, the handheld computer 105 can continue to one of several options prior to closing the communications channel. In flow chart 500, the handheld computer 105 continues with a keyboard timeout period 560. Data is received from the keyboard 150 within the keyboard timeout period 560 and the communications channel is closed 570. The keyboard timeout period 560 can be optional because the keyboard communication channel is only opened when key data is received, and the communication channel is immediately shut down upon receiving key data.

Whether the handheld computer 105 immediately closes the communications channel or executes multiple consecutive keyboard timeouts depends on factors including the time duration and power drain of opening the communications channel and activating the RS-232 drivers. For example, if the handheld computer can execute the necessary software and open the communications channel with sufficient speed and without a power consumption penalty, the communications channel may be opened and closed for each keystroke or group of keystrokes from the keyboard 150. In the event that the communications channel is immediately closed, the keyboard 150 can be adapted to send a wake-up signal automatically with every keystroke or group of keystrokes, or adapted to send a wake-up signal after a time-out expires.

B. Conclusion

The foregoing description of various embodiments of the invention has been presented for purposes of illustration and description. It is not intended to limit the invention to the precise forms disclosed. Many modifications and equivalent arrangements will be apparent.

The present invention also includes a hand held computer peripheral device identification system and method. A hand held computer peripheral device identification system and method of the present invention utilizes signals received on a serial port of a hand held computer to determine the identification of a peripheral device coupled to the serial port. In one embodiment of the present invention, a hand held computer peripheral device identification system and method tracks pulses in a signal received via an interrupt pin and correlates the number of received pulses with the type of peripheral device coupled to the serial port. In one exemplary implementation of the present invention, a hand held computer peripheral device identification detection system and method utilizes a hash table to map the number of pulses to a type of peripheral device.

Figure 6A:
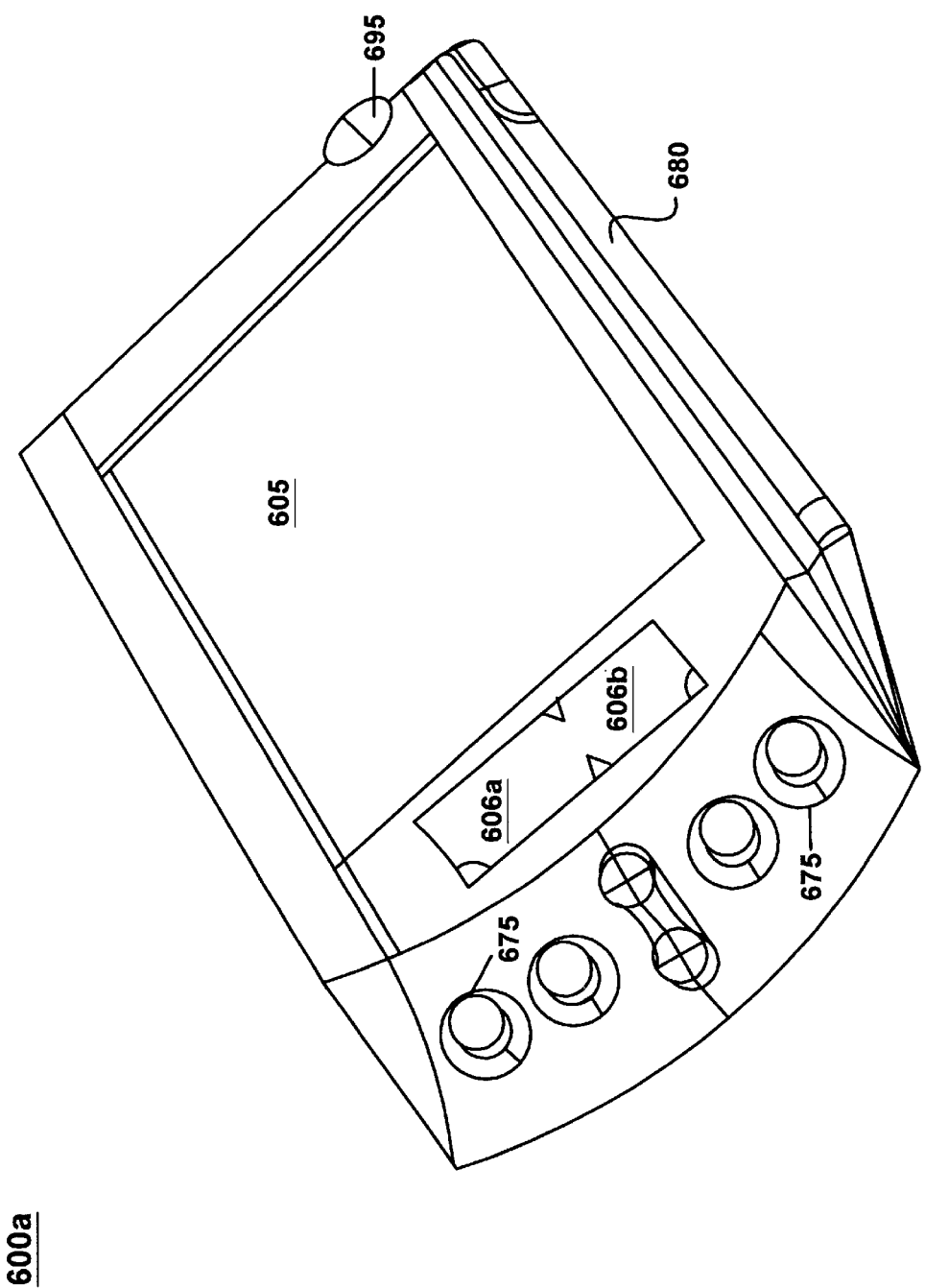
FIG. 6A is a perspective illustration of the top face of one embodiment of a hand held or palmtop computer system of the present invention.

FIG. 6A is a perspective illustration of the top face 600a of one embodiment of a hand held or palmtop computer system of the present invention. The top face 600a contains a display screen 605 surrounded by a bezel or cover. A removable stylus 680 is also shown. The display screen 605 is a touch screen able to register contact between the screen and the tip of the stylus 680. The stylus 680 can be of any material to make contact with the screen 605. The top face 600a also contains one or more dedicated and/or programmable buttons 675 for selecting information and causing the computer system to implement functions. The on/off button 695 is also shown. FIG. 6A also illustrates a handwriting recognition pad or "digitizer" containing two regions 606a and 606b. Region 606a is for the drawing of alpha characters therein for automatic recognition and region 606b is for the drawing of numeric characters therein for automatic recognition. The stylus 680 is used for stroking a character within one of the regions 606a and 606b. The stroke information is then fed to an internal processor for automatic character recognition. Once characters are recognized, they are typically displayed on the screen 605 for verification and/or modification.

Figure 6B:
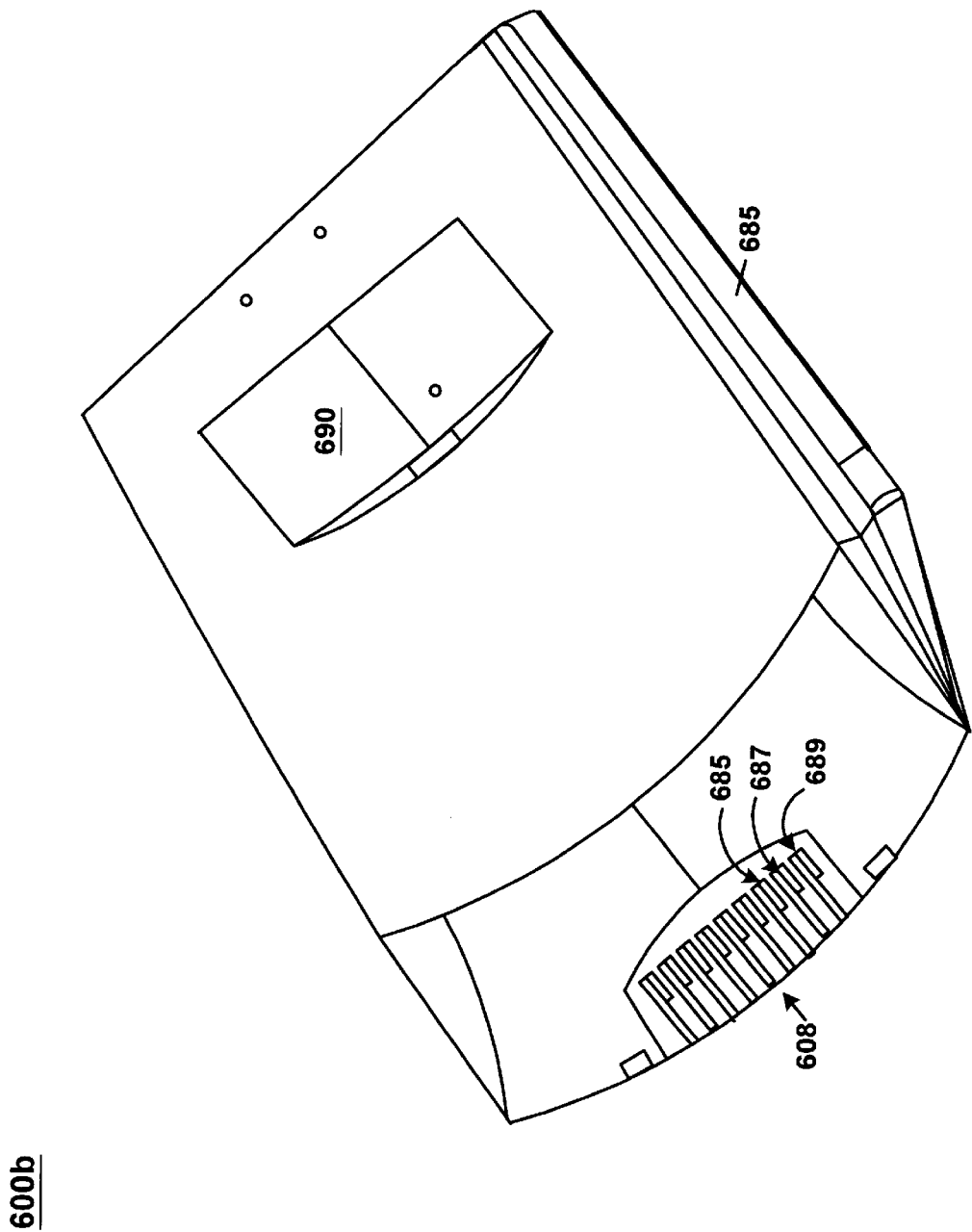
FIG. 6B illustrates the bottom side of one embodiment of a hand held or palmtop computer system of the present invention.

FIG. 6B illustrates the bottom side 600b of one embodiment of a hand held or palmtop computer system of the present invention. An optional extendible antenna 685 is shown and also a battery storage compartment door 690 is shown. A serial communication interface 608 is also shown. In one embodiment of the present invention, the serial communication interface 608 comprises an interrupt pin 689, a three volt pin 687 and a legacy identification pin 685. Interrupt pin 689 receives an interrupt signal, three volt pin 687 transmits a 3 volt signal and legacy identification pin 685 receives a legacy identification signal. In one embodiment of the present invention, the legacy identification signal is a logical 1 value if the peripheral device is a modem or a logical 0 value if the peripheral device is a cradle.

Figure 7:
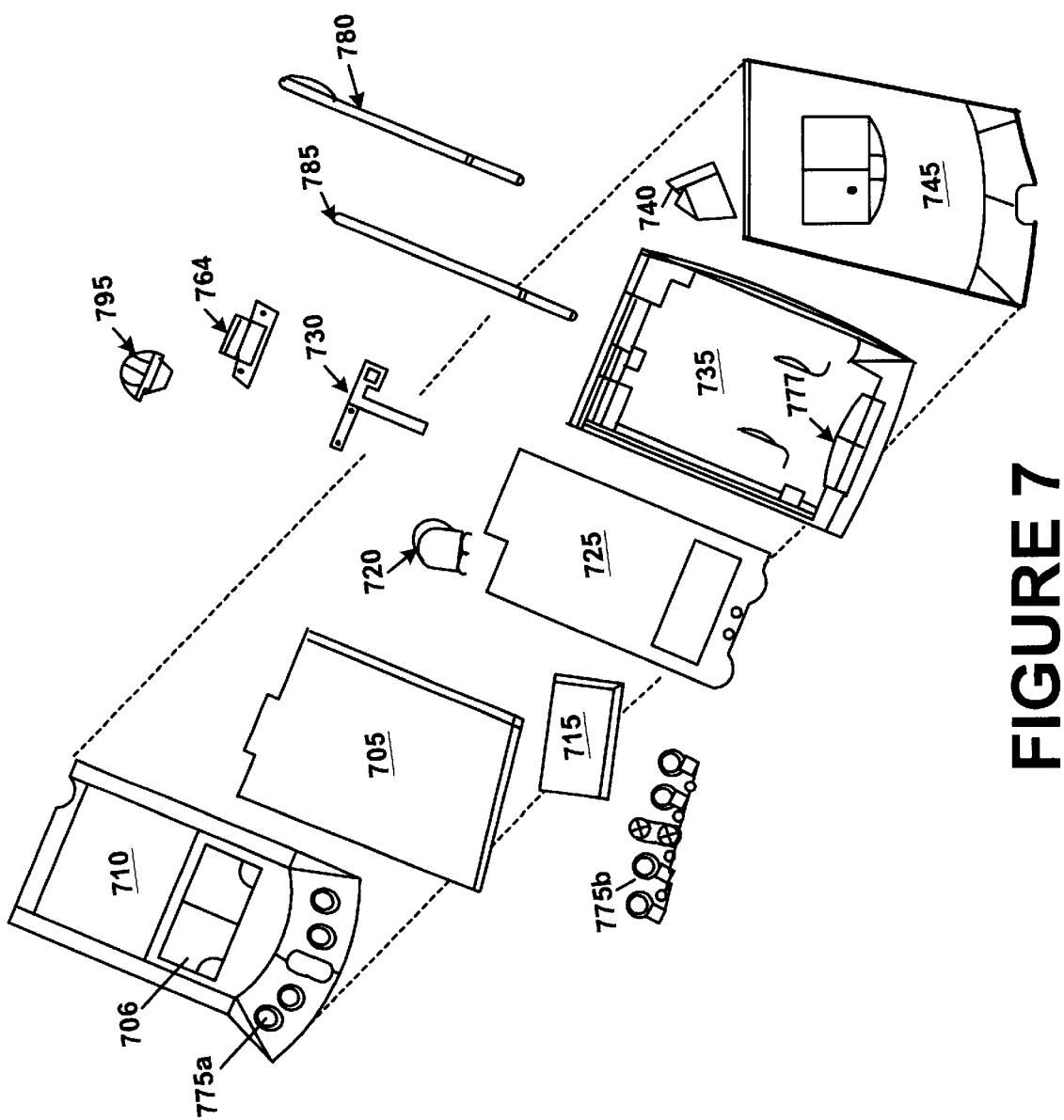
FIG. 7 is an exploded view of a hand held computer system in accordance with one implementation of the present invention.

FIG. 7 is an exploded view of the hand held computer system 700 in accordance with one implementation of the present invention. Hand held computer system 700 includes front cover 710 having an outline of region 706 and holes 775a for receiving buttons 775b. A flat panel display 705 (both liquid crystal display and touch screen) fits into front cover 710. Any of a number of display technologies can be used, e.g., LCD, FED, plasma, etc., for the flat panel display 705. A battery 715 provides electrical power. A contrast adjustment (potentiometer) 720 is also shown. On/off button 795 is shown along with an infrared emitter and detector device 764. A flex circuit 730 is shown along with a PC board 725 containing electronics and logic (e.g., memory, communication bus, processor, etc.) for implementing computer system functionality. The digitizer pad is also included in PC board 725. A midframe 735 is shown along with stylus 780.

Hand held computer system 700 is capable of communicating with other devices. Position adjustable antenna 785 for transmitting and receiving communication signals is shown. A radio receiver/transmitter device 740 is also shown between the midframe and the rear cover 745 of FIG. 7. The receiver/transmitter device 740 is coupled to the antenna 785 and also coupled to communicate with the PC board 725. In one implementation the Mobitex wireless communication system is used to provide two way communication between system 700 and other networked computers and/or the Internet via a proxy server. Communication interface 777 is coupled to PC board 725 and provides a communications port (e.g., a serial port) for communicating signals to and from a peripheral device.

Figure 8:
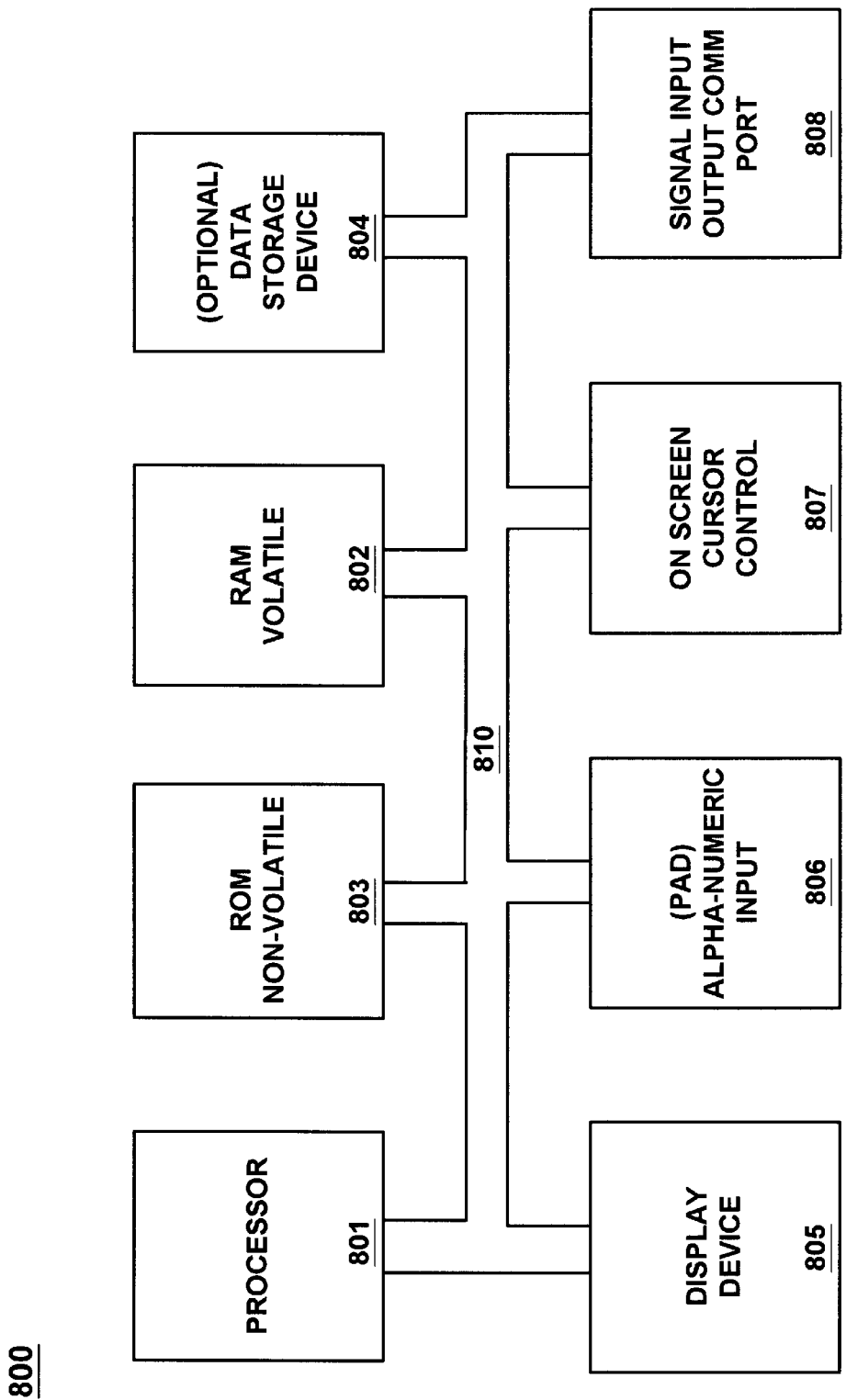
FIG. 8 is high level block diagram of a hand held computer system included in one embodiment of the present invention.

FIG. 8 is a block diagram of computer system 800 included in one embodiment of the present invention, some of which is implemented on PC board 725. Computer system 800 includes an address/data bus 810 for communicating information, a central processor 801 coupled with bus 810 for processing information and instructions, a volatile memory 802 (e.g., random access memory RAM) coupled with the bus 810 for storing information and instructions for the central processor 801 and a non-volatile memory 803 (e.g., read only memory ROM) coupled with the bus 810 for storing static information and instructions for the processor 801. Central processor 801 also processes information and instructions (e.g., an interrupt routine) for determining the identity of a variety of hand held computer peripheral devices. Computer system 800 also includes an optional data storage device 804 (e.g., memory stick) coupled with the bus 810 for storing information and instructions. Data storage device 804 can be removable. As described above, computer system 800 also contains a display device 805 coupled to the bus 100 for displaying information to the computer user. PC board 725 can contain the processor 801, the bus 810, the ROM 803 and the RAM 802.

Also included in computer system 800 of FIG. 8 is an optional alphanumeric input device 806 which in one implementation is a handwriting recognition pad ("digitizer") having regions 606a and 606b (FIG. 6A), for instance. Device 806 can communicate information and command selections to the central processor 801. System 800 also includes an optional cursor control or directing device 807 coupled to the bus for communicating user input information and command selections to the central processor 801. In one implementation, device 807 is a touch screen device incorporated with a screen of display device 805. Device 807 is capable of registering a position on the screen 805 where the stylus makes contact. The display device 805 utilized with the computer system 800 may be a liquid crystal device, cathode ray tube (CRT), field emission device (FED, also called flat panel CRT) or other display device suitable for creating graphic images and alphanumeric characters recognizable to the user. In the preferred embodiment, display 805 is a flat panel display. Signal Communication port 808 is a communication interface (e.g., serial communications port 608) for communicating signals to and from a coupled peripheral device (not shown).

In one embodiment of the present invention, a hand held computer serial port (e.g., serial port 608) receives an interrupt signal on an interrupt pin (e.g., interrupt pin 689) and a processor (e.g., processor 801) performs a peripheral device identification routine utilizing information encoded in the interrupt signal. In one embodiment of the present invention, the interrupt signal also operates as a wake up signal to the hand held computer and is utilized to wake up the hand held computer (e.g., from a power savings mode). In another embodiment of the present invention, a hand held computer does not wake up but does service the interrupt signal in some way, for example opens a serial port enabling the peripheral device and hand held computer to communicate. In one embodiment of the present invention, peripheral device identification routine is include in an interrupt routine and peripheral device identification is provided by analyzing pulses on an interrupt signal after an initial "wake up" interrupt pulse.

In one embodiment of a present invention hand held computer peripheral device identification system, the hand held computer interrupt routine continues to monitor for additional pulses in an interrupt signal after registering an initial interrupt pulse. In one embodiment of the present invention, if another interrupt pulse occurs within a predetermined time period the hand held computer tracks the number of additional pulses in the interrupt signal received after the initial pulse. In one embodiment of the present invention, the hand held computer tracks the number of additional pulses for a set period of time. In one exemplary implementation, the period of time the hand held computer continues to monitor for additional pulses in the interrupt signal is less than the fastest possible time that a human could create another interrupt pulse by pressing a switch that causes an interrupt signal. In one embodiment of the present invention, the period of time the palm continues to monitor for additional interrupt pulses is adjustable.

Figure 15:
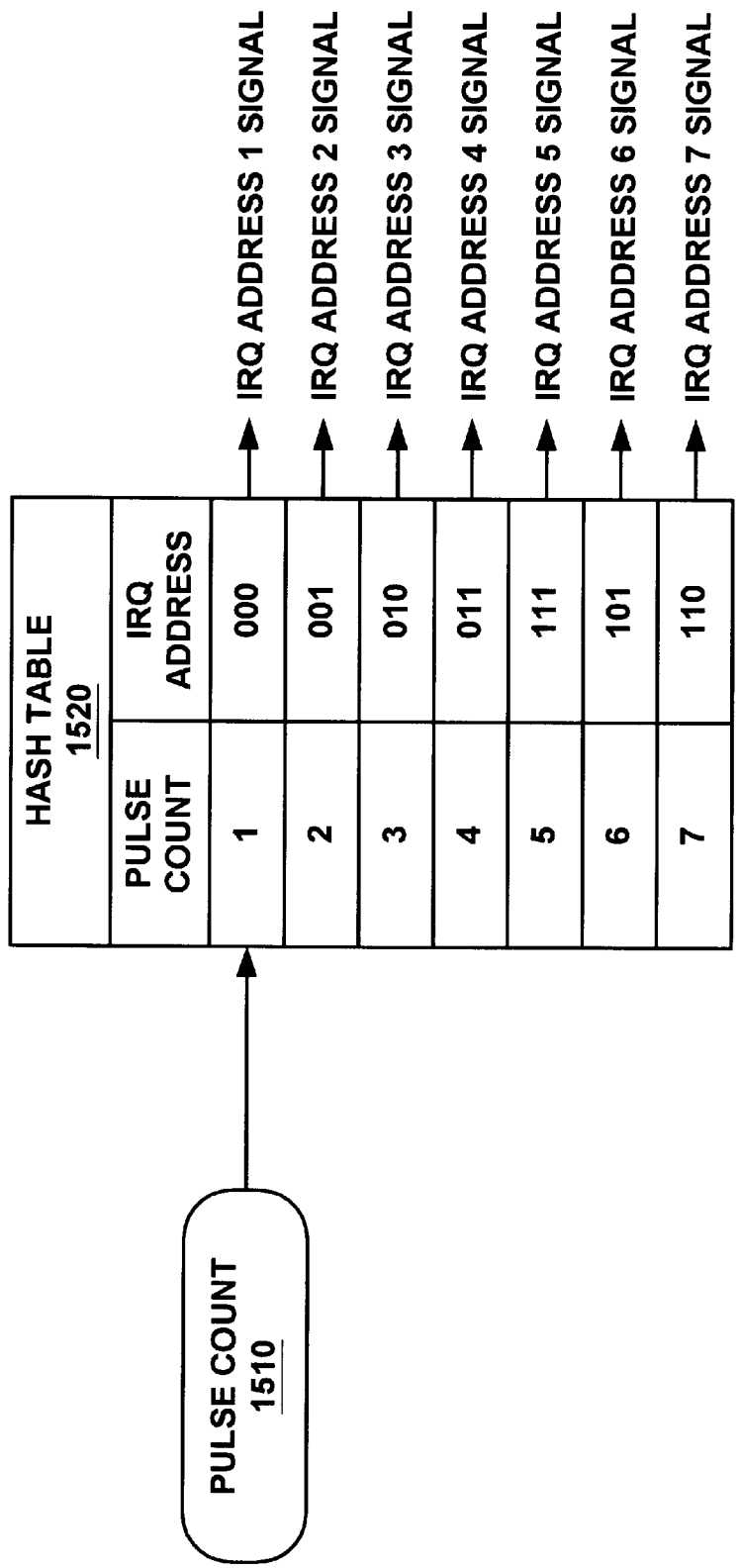
FIG. 15 is an illustration of a hash table included in one embodiment of the present invention.

In one embodiment of the present invention, the number of impulses included in an interrupt signal after an initial "wake up" pulse is associated with a type of hand held computer peripheral device. In one embodiment of the present invention, a hand held computer peripheral identification system includes a hash table that correlates a number of interrupt pulses to a type of hand held computer peripheral device. FIG. 15 is an illustration of hash table 1520 included in one embodiment of the present invention. Hash table 1520 comprises two columns of multiple rows. A first column includes pulse counts and a second column includes IRQ routine addresses. Hash table 150 receives pulse count signal 1510 and matches it to a pulse count in the pulse count column. Hash table 1520 then forwards the corresponding IRQ address included in the same row to an interrupt routine. The present invention is flexible and capable of accommodating numerous peripheral device requirements. For example, the first number of interrupt signal pulses (e.g., the first 20) are reserved for and associated with communication peripheral devices that require quick access to the hand held computer. The hash table is expandable and capable of providing significant amount of information (e.g., in a 20 bit data word). In one embodiment of the present invention, an entry in the hash table sends the processor to a different part or address of the interrupt request (IRQ) routine. In one embodiment of the present invention, the IRQ routine is one of a set of possible hardware interrupts identified by a number that indicates which interrupt handler is used. In one embodiment of the present invention the IRQ places a launch key into a processor queue.

Figure 9:
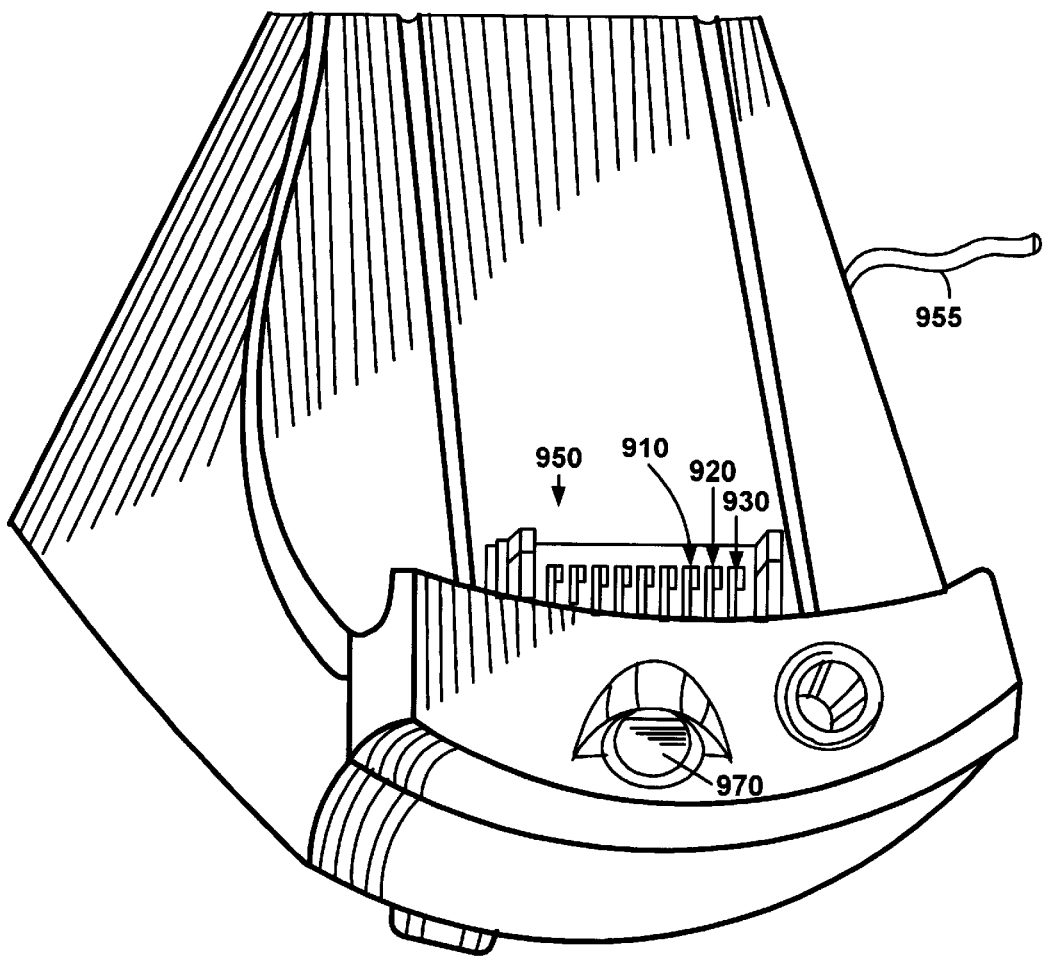
FIG. 9 is a perspective illustration of a cradle, one embodiment of a cradle for receiving a hand held computer system of the present invention.

FIG. 9 is a perspective illustration of cradle 900, one embodiment of a cradle for receiving the palmtop computer system 600. Cradle 900 contains a mechanical and electrical interface 950 for interfacing with serial connection 608 (FIG. 6B) of computer system 600 when system 600 is coupled to (e.g., slid into) the cradle 900 in an upright position. Electrical interface 950 includes a interrupt cradle pin 930, three volt cradle pin 920 and legacy identification cradle pin 910. Once computer system 600 is coupled to cradle 900, activation button 970 is pressed to initiate two way communication between computer system 600 and other computer systems coupled to serial communication link 955. In one embodiment of the present invention, a interrupt cradle pin 930 causes wake up signals and peripheral identification functions that are monitored by a hand held computer interrupt pin coupled to interrupt cradle pin 930.

Figure 10:
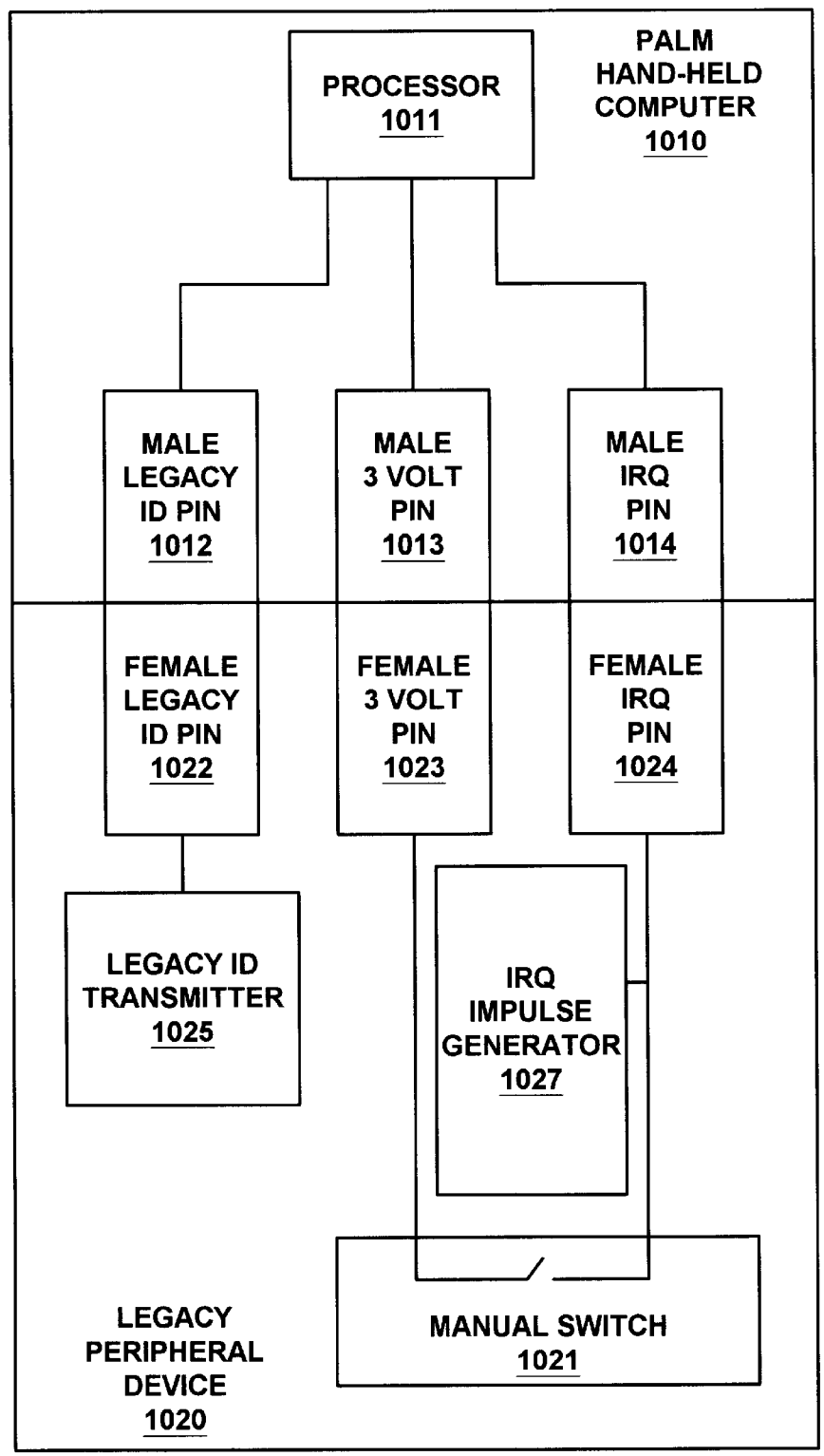
FIG. 10 is a schematic of a palm hand-held computer system coupled to a legacy peripheral device, one embodiment of the present invention.

FIG. 10 is a schematic of a palm hand-held computer system 1010 coupled to a legacy peripheral device 1020, one embodiment of the present invention. Hand-held computer system 1010 comprises processor 1011, male legacy identification (ID) pin 1012, male three volt pin 1013 and male interrupt (IRQ) pin 1014. Processor 1011 is coupled to male legacy identification (ID) pin 1012, male three volt pin 1013 and male IRQ pin 1014.

Legacy peripheral device 1020 comprises manual switch 1021, female three volt pin 1023, female interrupt (IRQ) pin 1024, IRQ impulse generator 1027, female legacy identification (ID) pin 1022 and legacy identification (ID) transmitter 1025. Male legacy identification (ID) pin 1012, male three volt pin 1013 and male IRQ pin 1014 are coupled to female legacy identification (ID) pin 1022, female three volt pin 1023, female IRQ pin 1024 respectively.

In one embodiment of the present invention, an initial interrupt signal includes a signal generated by a physical activation of a peripheral device. For example, a user physically pushes a button on a cradle (e.g., activation button 970) or modem and the cradle or modem transmits an interrupt signal to the palm device on an interrupt pin of a serial port (e.g., interrupt pin 689). In one embodiment of the present invention, pushing a button or throwing a switch in a cradle or modem closes a conductive path between a three volt pin and an interrupt pin resulting in an initial wake up interrupt signal. A predetermined number or count of additional pulses are generated by the peripheral device (e.g., by IRQ impulse generator 1027). The hand held computer continues to monitor the interrupt pin (e.g., interrupt pin 689) for additional pulses. In one embodiment of the present invention an initial wake up pulse is initiated automatically by a peripheral device and does not require a physical or manual activation.

In one embodiment of the present invention, the hand held computer is backward compatible with legacy peripheral devices (e.g., a cradle or modem) and if no additional pulses appear within the predetermined time period the hand held computer samples a legacy peripheral device identification signal pin (e.g., legacy peripheral device identification pin 685) to determine if a coupled peripheral device is a legacy cradle or a modem. For example, if a legacy device identification signal received on legacy peripheral device identification pin of the hand held computer is a logical 1 value the hand held device identifies the peripheral device as a modem. If the legacy device identification signal is a logical 0 the hand held computer identifies the peripheral device as a cradle. In one embodiment of the present invention, new model modems and cradles identify themselves to the hand held computer utilizing the present invention system and method of forwarding additional interrupt signals.

In one embodiment of the present, the hand held computer samples an interrupt pin after a predetermined period of time has expired to determine if any additional pulses were received. In one embodiment of the present invention the predetermined period of time is less than the fastest possible time that a human could create another interrupt (e.g., by physically pushing a button or manually throwing a switch). In one exemplary implementation, if another interrupt occurs the present invention hand held computer peripheral device identification system and method again waits, looping and counting interrupts until at some point the interrupt routine does not see another interrupt.

1 is a timing diagram of interrupt pluses of one embodiment of the present invention. Initial interrupt pulse. 1410 is generated when a user physically pushes a button (e.g., activation button 970) at time 1470.

Predetermined monitoring time period 1490 begins after initial interrupt pulse 1410 is received. During time period 1490 the hand held computer monitors and counts the interrupt signal pulses 142 through 1427. The hand held computer stops monitoring at the end of time period 1490 which is significantly before the next fastest manually triggered interrupt impulse 1430 at time 1475.

In one embodiment of the present invention the interrupt routine masks itself and the interrupt has access to two local variables. The variables include a predetermined time span that begins after examining if a pulse has occurred in an interrupt and the number of impulses received by a hand held computer after an initial wake up pulse in an interrupt signal. The interrupt routine goes into a wait state for the predetermined time span. If after the predetermined time elapses the number of pulse signals on the interrupt pin has not changed (e.g., it is the same number as the beginning last predetermined time span beginning) the interrupt routine utilizes the number of pulse signals received after the initial interrupt pulse to identify the peripheral device. If the number of pulses has changed the interrupt routine the resets the time clock (e.g., several microseconds) and waits another time period before checking if the number of received pulses has changed. In one embodiment of the present invention the granularity of the clock is 10 microseconds.

Figure 11:
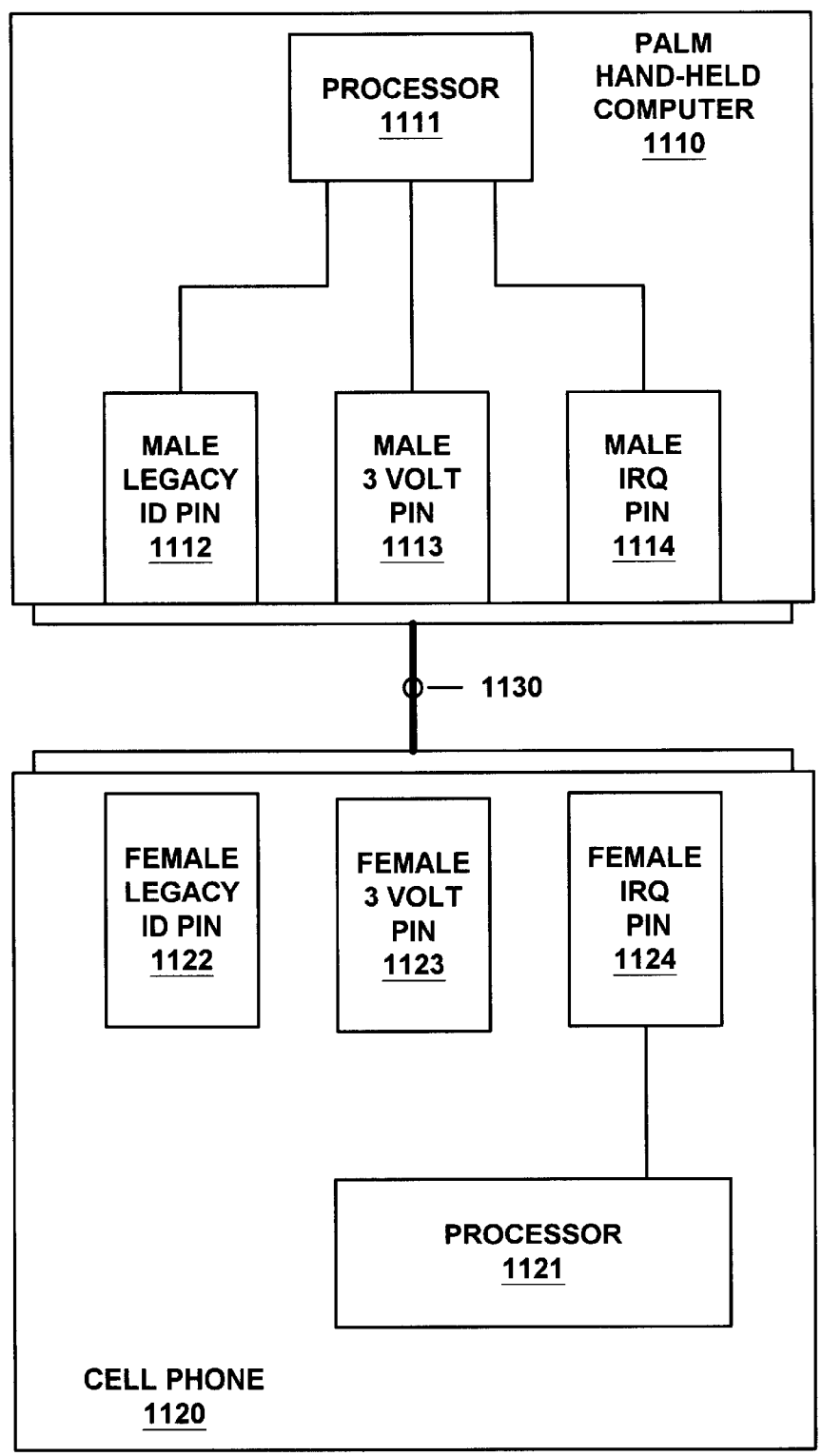
FIG. 11 is a schematic of hand held computer coupled to a cell phone, one embodiment of the present invention.

In one embodiment of the present invention, a hand held computer is coupled to a cellular phone. FIG. 11 is a schematic of hand held computer 1110 coupled to cell phone 1120, one embodiment of the present invention. Hand held computer 1110 includes processor 1111, male legacy identification (ID) pin 1112, male three volt pin 1113 and male interrupt (IRQ) pin 1114. Processor 1111 is coupled to male legacy identification (ID) pin 1012, male three volt pin 1013 and male interrupt (IRQ) pin 1014. Cell phone 1120 includes a processor 1121, female legacy identification (ID) pin 1122, female three volt pin 1123 and female interrupt (IRQ) pin 1124. Processor 1121 is coupled to female legacy identification (ID) pin 1122, female three volt pin 1123 and female IRQ pin 1124. Male legacy identification (ID) pin 1112, male three volt pin 1113 and male IRQ pin 1114 are communicatively coupled to female legacy identification (ID) pin 1122, female three volt pin 1123 and female IRQ pin 1124 respectively via cable 1130.

In one embodiment of the present invention, cellular phone 1120 asynchronously communicates with hand held computer 1110 in cellular mode in accordance with a cellular communication standard such as HARDY or Bluetooth personal communication services (PCS). In one exemplary implementation, HARDY is assigned 2 hash codes of (e.g., seven pulses and eight pulses), the first hash code (e.g., 7 interrupt pulses) is for a short messaging service (SMS) code and the second hash code (e.g., 8 interrupt pulses) is "tied to" or associated with other HARDY codes. If after receiving an initial interrupt signal, hand held computer 1110 receives a predetermined number of additional pulses (e.g., 7) via interrupt pin 1124, hand held computer 1110 identifies the peripheral device as a cell phone and launches an application or UI thread of the SMS application. For example, the hand held computer is launched with a data ready launch code that indicates there is data waiting to be communication on a serial port. The hand held computer opens the SMS application and knows it was launched by an interrupt signal on the serial port and activates the serial port for communication. The hand held computer is ready to receive a SMS message from the cell phone over the serial port in an appropriate protocol and show it on a display of the hand held computer. In one embodiment of the present invention, the initial interrupt signal functions as a wake up signal that activates the serial port line driver and pulls 20 milliamps.

In one embodiment of the present invention, a hand held computer utilizes the pulses included in an interrupt signal to represent binary words of logical ones and zeroes. The hand held computer peripheral device identification system utilizes the binary words to identify the type of peripheral device coupled to the hand held computer. In one embodiment of the present invention, signals received on the legacy peripheral device identification pin are utilized as a clock to synchronize the sampling of the pulses on the interrupt signal.

Figure 12:
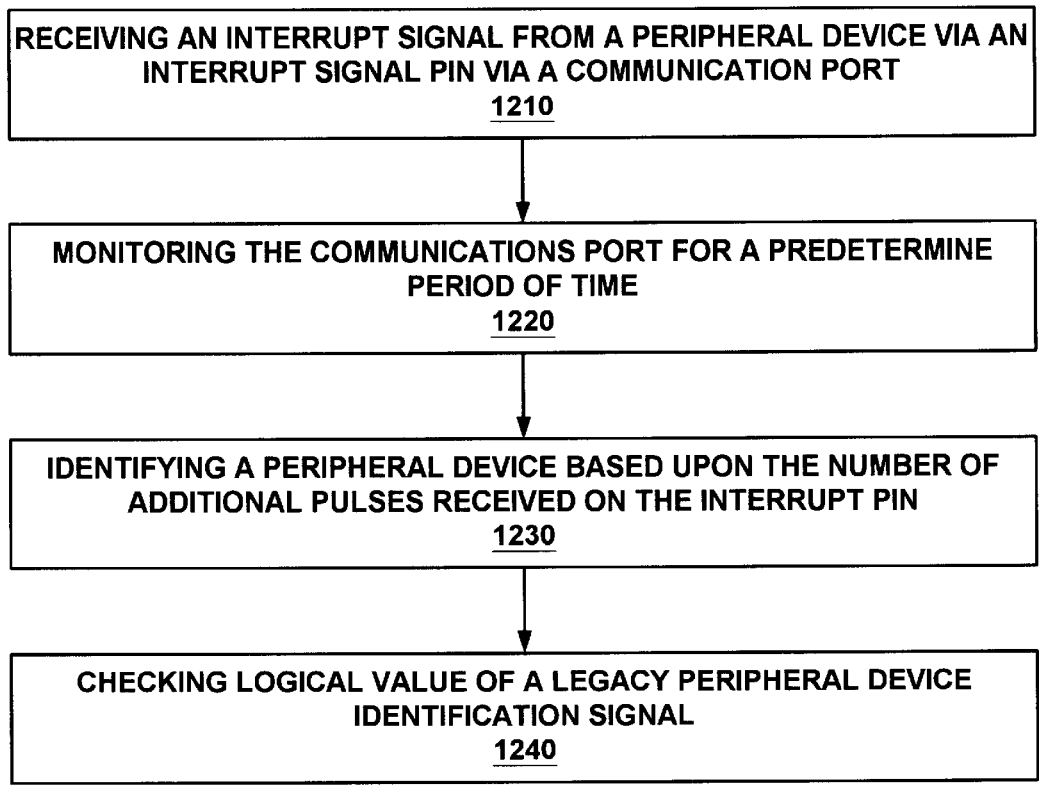
FIG. 12 is a flow chart of hand held computer peripheral device identification method, one embodiment of the present invention.

FIG. 12 is a flow chart of hand held computer peripheral device identification method 1200, one embodiment of the present invention. Hand held computer peripheral device identification method 1200 provides expandable identification of a variety of hand held computer peripheral devices. In one embodiment of the present invention, hand held computer peripheral device identification method 1200 is backwards compatible and capable of identifying legacy hand held computer peripheral devices.

In Step 1210 an interrupt signal is received from a peripheral device via an interrupt signal pin included in a communication port of the hand held computer. The interrupt signal is forwarded from a hand held computer peripheral device coupled to the hand held computer. In one embodiment of the present invention, the interrupt signal comprises an initial wake up pulse followed by additional pulses in the interrupt signal. In one embodiment of hand held computer peripheral device identification method 1200, the initial wake up pulse is an interrupt signal is.caused by a physical manipulation of a switch included in a hand held computer peripheral device.

Hand held computer peripheral device identification method 1200 monitors the communications port for a predetermined period of time in Step 1220 to determine if additional pluses are received on an interrupt signal pin of the communications port. In one embodiment of the present invention the predetermined time period is 20 microseconds. In one embodiment of the present invention the period of time the hand held computer continues to monitor for additional interrupt signals is less than the fastest possible time that a human could create another interrupt. In one embodiment of the present invention the period of time said hand held computer continues to monitor for additional interrupt signals is adjustable.

In Step 1230 the peripheral device is identified based upon the number of additional pulses received via the interrupt pin included in a communications port of the hand held computer. In one embodiment of the present invention hand held computer peripheral device identification method 1200 maintains a hash table comprising a listing of possible peripheral device identifications and corresponding number of interrupt pulse signals. Hand held computer peripheral device identification method 1200 utilizes the hash table as a look up table to identifying said peripheral device.

In Step 1240, hand held computer peripheral device identification method 1200 checks the logical value of a legacy peripheral device identification signal. In one embodiment of the present invention, if the legacy peripheral device identification signal is a logical 1 value hand held computer peripheral device identification method 1200 identifies the peripheral device as a legacy modem. If the legacy peripheral device identification signal is a logical 0 value, hand held computer peripheral device identification method 1200 identifies the peripheral device as a legacy cradle.

Figure 13:
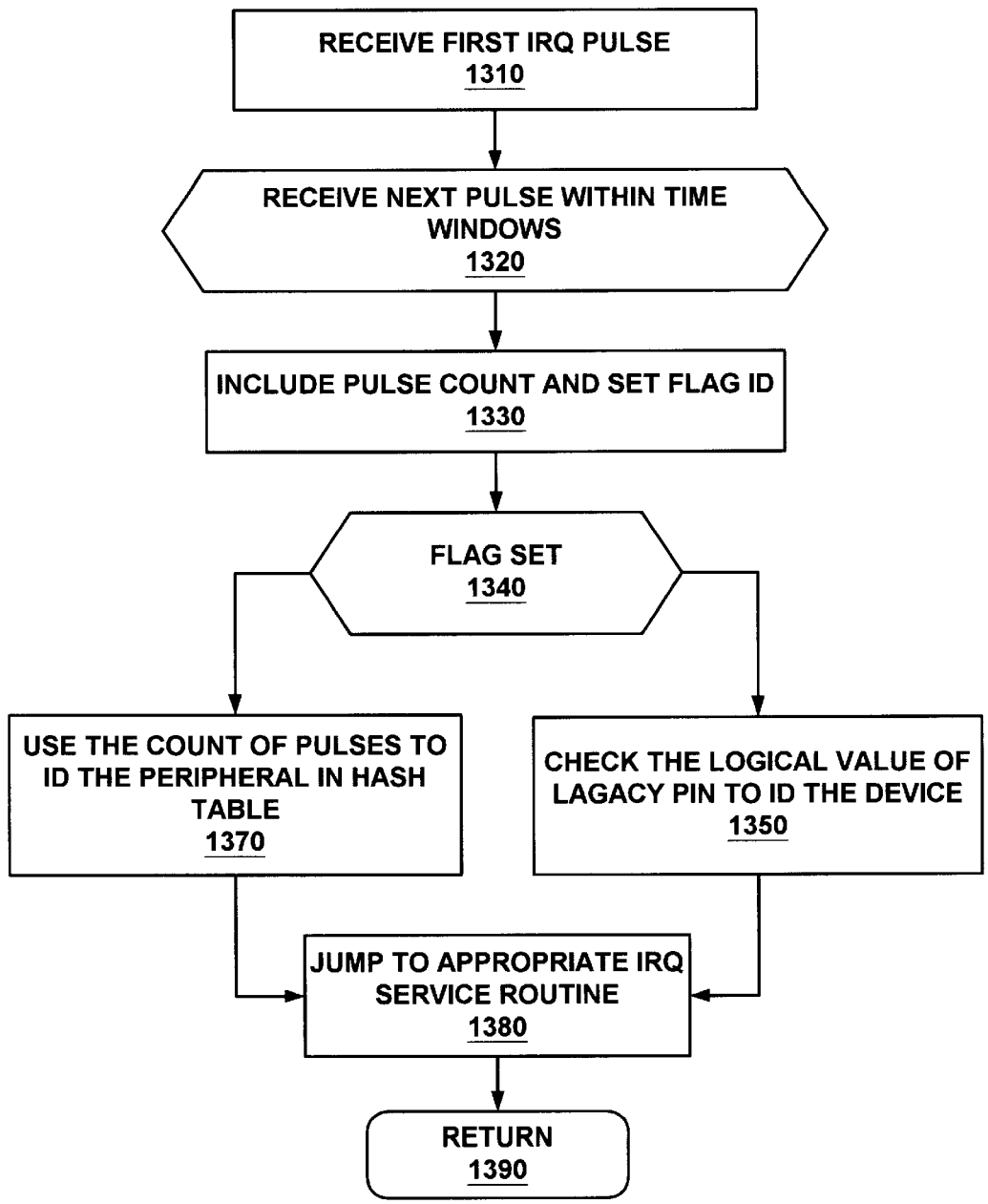
FIG. 13 is a flow chart of another expanded hand held computer peripheral device identification method of the present invention.
Figure 14:
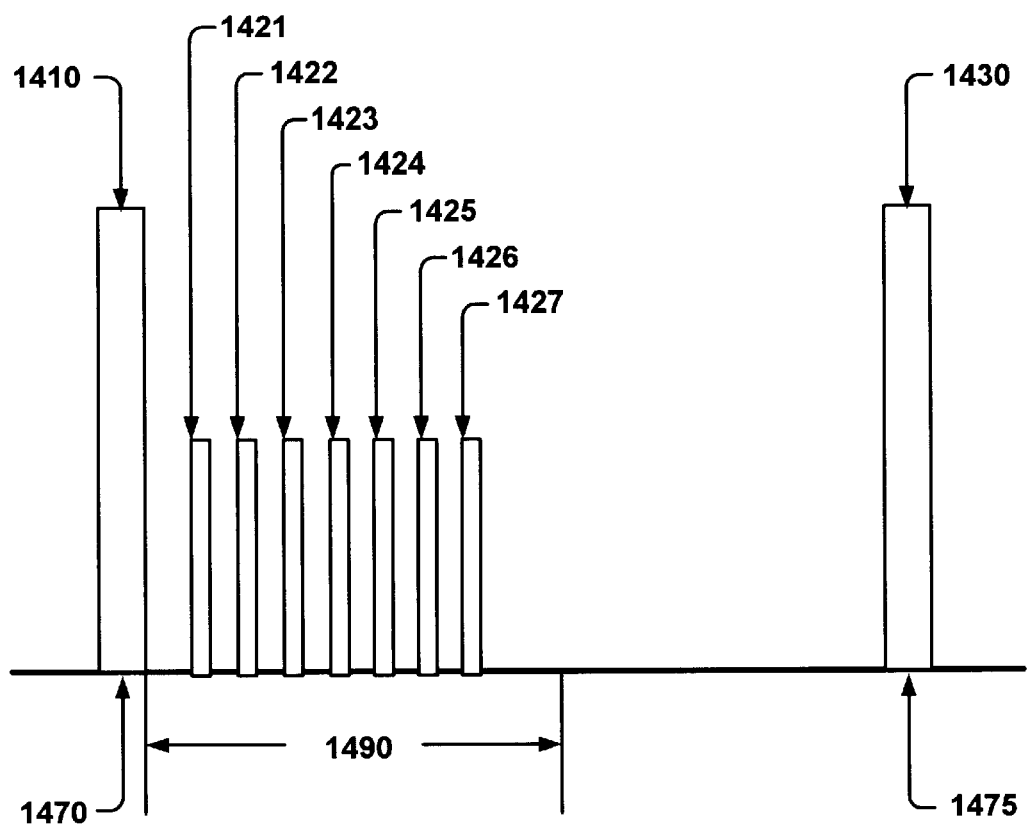
FIG. 14 is a timing diagram of interrupt pluses of one embodiment of the present invention.

FIG. 13 is a flow chart of hand held computer peripheral, device identification method 1300, another embodiment of the present invention. Hand held computer peripheral device identification method 1300 is an expansion of held computer peripheral device identification method 1200. In one embodiment of the present invention, hand held computer peripheral device identification method 1300 includes backward compatibility with legacy peripheral devices and initiates procedures to implement applications.

In Step 1310 an initial interrupt pulse is received from a peripheral device via an interrupt signal pin included in a communication port of a hand held computer. The initial interrupt pulse is forwarded from a hand held computer peripheral device coupled to the hand held computer. In one embodiment of the present invention, the initial interrupt signal operates as a wake up signal. In one embodiment of hand held computer peripheral device identification method 1300, the initial wake up pulse is caused by a physical manipulation of a switch included in a hand held computer peripheral device.

In Step 1320 hand held computer peripheral device identification method 1300 determines if additional pulses are received on an interrupt signal pin of the communications port within a predetermined time window. In one embodiment of the present invention the predetermined time period is 20 microseconds. In one embodiment of the present invention the time window is less than the fastest possible time that a human could create another interrupt. If an additional pulse is received hand held computer peripheral device identification method 1300 proceeds to step 1330. If no additional pulse is received hand held computer peripheral device identification method 1300 proceeds to step 1340.

Hand held computer peripheral device identification method 1300 increments a pulse count variable and sets an identification (ID) flag in step 1330. After a flag is set the process returns to step 1320.

In Step 1340 hand held computer peripheral device identification method 1300 determines if an ID flag is set. If a flag is set, hand held computer peripheral device identification method 1300 proceeds to step 1370. If the flag is not set, hand held computer peripheral device identification method 1300 proceeds to step 1350.

In step 1350 hand held computer peripheral device identification method 1300 checks the logical value of a signal on a legacy pin of a hand held computer serial communications port. In one embodiment of the present invention, if the legacy peripheral device identification signal is a logical 1 value hand held computer peripheral device identification method 1300 identifies the peripheral device as a legacy modem. If the legacy peripheral device identification signal is a logical 0 value, hand held computer peripheral device identification method 1300 identifies the peripheral device as a legacy cradle.

In step 1370 the count of pulses is used to identify the peripheral device. In one embodiment of the present invention, hand held computer peripheral device identification method 1300 utilizes a hash table comprises a listing of possible peripheral device identifications and corresponding count of interrupt pulse signals to provide a correlation between the pulse count and a peripheral device identification. Hand held computer peripheral device identification method 1300 utilizes the hash table as a look up table to identifying said peripheral device.

In Step 1380 the process jumps to an appropriate interrupt service routine. In one embodiment of the present invention, the hash table includes another column comprising information related to an appropriate interrupt routine and the process jumps to an interrupt routine associated with the interrupt pulse count. In one embodiment of the present invention, two different counts send the process to addresses of different interrupt routines that service the same type of peripheral device. For example, in one embodiment of the present invention, a cell phone is coupled to a hand held computer and a first count of interrupt pulses causes the process to jump to an interrupt service routine that opens up a serial port in the hand held computer and lets Hardy deal with opening applications. A second count of interrupt pulses launches an SMS application in the UI thread with a launch code. The SMS application comes up and knows it has been launched from the serial port so the hand held computer opens the serial port and a SMS protocol to pull the message from the cell phone is initiated.

In step 1390 hand held computer peripheral device identification method 1300 returns to step 1310 and waits for another initial interrupt pulse.

Thus, the hand held computer peripheral device identification system and method of the present invention facilitates extendible identification of various peripheral devices. The present invention is backward compatible with legacy peripheral device identification systems and methods. The present invention permits a hand held computer to identify the type of peripheral device initiating a wake up operation in a hand held computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hand held computer communication port management system comprising:

a processor for performing an interrupt routine that identifies a peripheral device from more than two types of peripheral devices based upon pulses in an interrupt signal, wherein said interrupt routine monitors said interrupt signal and tracks the number of pulses following an initial pulse that are separated by a period less than a threshold amount; and a serial communication port for receiving said interrupt signal from said peripheral device, said serial communications port coupled to said processor, wherein said serial communication port further comprises an interrupt signal pin for receiving said interrupt signal.

2. The hand held computer communication port management system of claim 1 further comprising a memory for storing a hash table associating a number of pulses in said interrupt signal to a type of peripheral device.

3. The hand held computer communication port management system of claim 2 wherein said processor utilizes information stored in said hash table to determine the type of peripheral device coupled to said hand held computer.

4. The hand held computer communication port management system of claim 2 wherein an entry in said hash table sends said processor to a different address of said interrupt routine.

5. The hand held computer communication port management system of claim 4 in which said interrupt routine places an application launch key into a queue of said processor.

6. A hand held computer peripheral device identification system comprising:

a processor for performing an interrupt routine that identifies a peripheral device from more than two types of peripheral devices;

an interrupt signal pin for receiving said interrupt signal from said peripheral device, said interrupt pin coupled to said processor; and a legacy peripheral device identification pin for receiving a legacy peripheral device identification signal, said peripheral device identification pin coupled to said processor.

7. The hand held computer peripheral device identification system of claim 6 wherein said interrupt routine monitors said interrupt signal and tracks the number of pulses following an initial pulse within a predetermined time.

8. The hand held computer peripheral device identification system of claim 7 wherein said processor identifies a peripheral device based upon a signal on said peripheral device identification pin if said interrupt routine monitors said interrupt signal and receives no pulses within a predetermined time following an initial interrupt wake up pulse.

9. The hand held computer peripheral device identification system of claim 6 wherein said hand held computer samples an interrupt pin after a predetermined period of time has expired to determine if any additional pulses were received.

10. The hand held computer peripheral device identification system of claim 8 in which a hand held computer utilizes the pulses included in an interrupt signal to represent binary words of logical ones and zeroes that identify said peripheral device.

11. A method of managing a communications port in a handheld computer communicatively coupled to a peripheral device via said communications port, the method comprising the steps of:

receiving an interrupt signal from said peripheral device via an interrupt signal pin included in communication port of said hand held computer;

monitoring said communications port for a predetermined period of time to determine if additional pluses are received on an interrupt signal pin of said communications port; and identifying said peripheral device based upon the number of additional pulses received via said interrupt pin of said communications port of said hand held computer.

12. The method of managing a communications port of claim 11, further comprising the steps of:
   maintaining a hash table comprising a listing of possible peripheral device identifications and corresponding number of interrupt pulse signals; and
   utilizing said has hash table as a look up table to identifying said peripheral device.

13. The method of managing a communications port of claim 11, wherein said predetermined time is 20 microseconds.

14. The method of managing a communications port of claim 11, wherein said period of time said hand held computer continues to monitor for additional interrupt signals is less than the fastest possible time that a human could create another interrupt.

15. The method of managing a communications port of claim 11, wherein said period of time said hand held computer continues to monitor for additional interrupt signals is adjustable.

16. The method of managing a communications port of claim 11, further comprising the step of causing an initial wake up pulse by a physical manipulation of a switch included in a hand held computer peripheral device.

17. The method of managing a communications port of claim 11, further comprising the steps of:
   checking the logical value of a legacy peripheral device identification signal; and
   determining the identification of a peripheral device type based upon the logical value of a legacy peripheral device identification signal.

18. A hand held computer peripheral device identification method comprising the steps of:
   receiving an initial interrupt pulse from a peripheral device via an interrupt signal pin included in a communication port of a hand held computer;
   determining if additional pulses are received on said interrupt signal pin of said communications port within a predetermined time window;
   incrementing a pulse count variable and setting an identification (ID) flag;
   using the count of pulses to identify said peripheral device; and
   jumping to an appropriate interrupt service routine.

19. A hand held computer peripheral device identification method of claim 18 further comprising the steps of:
   determining if said ID flag is set;
   checking the logical value of a signal on a legacy pin of said hand held computer serial communications port if said ID flag is not set; and
   identifying a legacy peripheral device based upon said logical value of said signal on said legacy pin of said hand held computer serial communications port.

20. A hand held computer peripheral device identification method of claim 18 wherein said time window is less than the fastest possible time that a human could create another interrupt.

21. A hand held computer peripheral device identification method of claim 18 wherein a hash table is utilized to identify said peripheral device, said hash table comprising a listing of possible peripheral device identifications and corresponding count of interrupt pulse signals to provide a correlation between said pulse count and said peripheral device identification.

22. A hand held computer peripheral device identification method of claim 18 further comprising the step of launching an application based upon said pulse count.

* * * * *